(12) United States Patent
Tamai et al.

(10) Patent No.: US 9,073,289 B2
(45) Date of Patent: Jul. 7, 2015

(54) HONEYCOMB STRUCTURAL BODY

(71) Applicant: DENSO CORPORATION, Kariya, Aichi-pref. (JP)

(72) Inventors: Koji Tamai, Nagoya (JP); Naohiro Hayashi, Kariya (JP)

(73) Assignee: DENSO CORPORATION, Kariya (JP)

( * ) Notice: Subject to any disclaimer, the term of this patent is extended or adjusted under 35 U.S.C. 154(b) by 5 days.

(21) Appl. No.: 14/149,935

(22) Filed: Jan. 8, 2014

(65) Prior Publication Data

US 2014/0205794 A1 Jul. 24, 2014

(30) Foreign Application Priority Data

Jan. 18, 2013 (JP) .................................. 2013-007752

(51) Int. Cl.
*B01D 46/24* (2006.01)
*F01N 3/022* (2006.01)
*B32B 3/12* (2006.01)
*F01N 3/00* (2006.01)

(52) U.S. Cl.
CPC ........... *B32B 3/12* (2013.01); *Y10T 428/24149* (2015.01); *B01D 46/247* (2013.01); *B01D 46/2474* (2013.01); *F01N 3/00* (2013.01)

(58) Field of Classification Search
None
See application file for complete search history.

(56) References Cited

U.S. PATENT DOCUMENTS

| 4,810,554 | A | * | 3/1989 | Hattori et al. | 428/116 |
| 5,108,685 | A | * | 4/1992 | Kragle | 428/116 |
| 5,916,133 | A | | 6/1999 | Buhrmaster et al. | |
| 5,952,079 | A | * | 9/1999 | Andou et al. | 428/116 |
| 6,248,421 | B1 | * | 6/2001 | Koike et al. | 428/116 |
| 7,244,284 | B2 | * | 7/2007 | Miwa et al. | 55/523 |
| 7,575,793 | B2 | * | 8/2009 | Aniolek et al. | 428/116 |
| 8,808,836 | B2 | * | 8/2014 | Hiratsuka | 428/118 |

(Continued)

FOREIGN PATENT DOCUMENTS

| JP | 62-187628 | 11/1987 |
| JP | 10-192635 | 7/1998 |

(Continued)

*Primary Examiner* — David Sample
*Assistant Examiner* — Nicholas W Jordan
(74) *Attorney, Agent, or Firm* — Nixon & Vanderhye P.C.

(57) ABSTRACT

A honeycomb structural body has a central part, an outer-circumferential part and a boundary-partition wall. The central part has central basic-cell walls and central reinforced-cell walls. The outer-circumferential part has outer-circumferential basic-cell walls and outer-circumferential reinforced-cell walls. The body satisfies $R1/P1 \geq 0.5$, $R2/P2 \geq 0.5$, $T10 \geq T20$, $T11 > T21$, $T3 > T10$, $T3 > T20$, $T3 \geq T11$ and $T3 > T21$, where R1 indicates a distance from the boundary-partition wall toward a radially-inward direction of the body, P1 indicates an average cell-pitch in the central part, R2 indicates a distance from the boundary-partition wall toward a radially outward direction of the body, P2 indicates an average cell-pitch in the outer-circumferential part, T10 indicates an average-thickness of the central basic-cell walls, T20 indicates an average-thickness of the outer-circumferential basic-cell walls, T11 indicates an average-thickness of the central reinforced-cell walls, T21 indicates an average-thickness of the outer-circumferential reinforced-cell walls, and T3 indicates an average-thickness of the boundary-partition wall.

16 Claims, 23 Drawing Sheets

(56) References Cited

U.S. PATENT DOCUMENTS

| | | |
|---|---|---|
| 2002/0042344 A1 | 4/2002 | Kondo et al. |
| 2004/0071932 A1* | 4/2004 | Ishihara et al. ............... 428/116 |
| 2004/0131512 A1* | 7/2004 | Abe et al. ...................... 422/180 |
| 2009/0011181 A1* | 1/2009 | Mizuno et al. ................ 428/118 |
| 2010/0205918 A1* | 8/2010 | Dietzhausen et al. .......... 55/419 |
| 2012/0270010 A1* | 10/2012 | Hiratsuka .................... 428/118 |
| 2012/0317942 A1* | 12/2012 | Komori et al. .................. 55/483 |
| 2013/0045148 A1* | 2/2013 | Chivilikhin et al. .......... 423/212 |
| 2015/0005153 A1* | 1/2015 | Hayashi et al. ................. 502/87 |

FOREIGN PATENT DOCUMENTS

| | | |
|---|---|---|
| JP | 2002-177794 | 6/2002 |
| JP | 2008-018370 | 1/2008 |
| JP | 2008018370 A * | 1/2008 |
| JP | 2008-200605 | 9/2008 |
| JP | 2012-189229 | 10/2012 |
| JP | 2012200625 A * | 10/2012 |
| JP | 2013-154278 | 8/2013 |
| JP | 2013-173133 | 9/2013 |
| JP | 2013-173134 | 9/2013 |

* cited by examiner

HONEYCOMB STRUCTURAL BODY

CROSS-REFERENCE TO RELATED APPLICATION

This application is related to and claims priority from Japanese Patent Application No. 2013-7752 filed on Jan. 18, 2013, the contents of which are hereby incorporated by reference.

BACKGROUND OF THE INVENTION

1. Field of the Invention

The present invention relates to honeycomb structural bodies capable of supporting catalyst therein to purify exhaust gas emitted from an internal combustion engine mounted to motor vehicles, etc.

2. Description of the Related Art

There have been known and used honeycomb structural bodies capable of supporting catalyst therein and purifying exhaust gas emitted from internal combustion engine mounted to motor vehicles, etc. For example, a honeycomb structural body is comprised of a plurality of cells and cell walls. Each of the cells is surrounded by the cell walls arranged in a lattice shape. Such a honeycomb structural body is arranged in the inside of an exhaust gas pipe through which exhaust gas is discharged. The exhaust gas has a high temperature because of being emitted from the internal combustion engine. When the exhaust gas having a high temperature is passing through the inside of the cells formed in the honeycomb structural body, the catalyst supported by the cell walls is activated by the exhaust gas having a high temperature. The activated catalyst in the honeycomb structural body purifies the exhaust gas. The purified exhaust gas is then discharged to the outside of the exhaust gas pipe.

Recently, because the vehicle emissions control of reducing motor vehicle emissions, etc. is becoming stricter year by year, there is a strong demand to more decrease toxic substances or harmful substances (cold start emission) generated immediately when an internal combustion engine starts. In order to achieve this demand, there have been proposed various methods of arranging a honeycomb structural body at a position more close to the internal combustion engine in order to speedily increase a temperature of the catalyst to an activation temperature of the catalyst. In other words, it is required for a honeycomb structural body to have a higher purifying performance For example, a patent document, Japanese patent laid open publication No. JP 2008-18370 discloses a honeycomb structural body having a conventional structure in which an inner circumferential wall (hereinafter, referred to as the boundary partition wall) is formed between a central part and an outer circumferential part of the honeycomb structural body, and an opening ratio of the outer circumferential part is greater than that of the central part.

In general, such an opening ratio in an area is in inverse proportion to a cell density in the area. For example, the more the opening ration increases, the more the cell density decreases. Because the outer circumferential part has a resistance to flow exhaust gas, which is larger than that of the central part in the honeycomb structural body, the patent document JP 2008-18370 has proposed a structure in which the outer circumferential part has an increased opening ratio. This proposed structure makes an easy flow of the exhaust gas in the outer circumferential part.

This makes it possible to uniform the flow rate of the exhaust gas between the central part and the outer circumferential part, and speedily activate the catalyst supported by the entire honeycomb structural body. This can increase the purifying performance of the honeycomb structural body.

However, the honeycomb structural body disclosed in JP 2008-18370 does not have an adequately-required structural strength against various stress such as external stress generated when the honeycomb structural body is mounted to an exhaust gas pipe of an internal combustion engine. That is, although the boundary partition wall is formed between the central part and the outer circumferential part in order to keep an entire strength of the honeycomb structural body, it is not always possible for the boundary partition wall to have an adequate strength against the external stress.

In order to solve such a conventional problem, it can be considered to increase a thickness of the boundary partition wall and the cell walls around the boundary partition wall. However, even if a thickness of the boundary partition wall and a thickness of the cell walls around the boundary partition wall are simply increased, a feeding speed and a feeding amount of raw material are varied when the raw material is fed through an extruding die during a manufacturing process of a honeycomb structural body. As a result, there is a possibility of decreasing an overall strength of the honeycomb structural body manufactured.

SUMMARY

It is therefore desired to provide a honeycomb structural body having an increased strength while decreasing occurrence of formation failure and defects of cell walls An exemplary embodiment provides a honeycomb structural body comprised of a plurality of cells and cell walls. Each of the cells walls is surrounded by the cell walls. The honeycomb structural body has a cross section which is perpendicular to an axial direction of the honeycomb structural body. In a structure of the honeycomb structural body, a central part and an outer circumferential part are formed. The central part includes a central axis of the honeycomb structural body. The central part is covered with the outer circumferential part. The outer circumferential part is lower in a cell density than the central part. Further, a boundary partition wall is formed between the central part and the outer circumferential part. The cell walls in the central part are comprised of central basic cell walls and central reinforced cell walls. The central reinforced cell walls are formed in a central reinforced area within a range of distance R1 which is measured from the boundary partition wall toward a radially inward direction of the cross section. The central reinforced cell walls surround all of the cells having an opening part in the central reinforced area. The cell walls in the outer circumferential part are comprised of outer circumferential basic cell walls and outer circumferential reinforced cell walls. The outer circumferential reinforced cell walls are formed in an outer circumferential reinforced area within a distance R2 which is measured from the boundary partition wall toward a radially outward direction of the cross section. The outer circumferential reinforced cell walls surround all of the cells having an opening part in the outer circumferential reinforced area. The honeycomb structural body has the structure which satisfies first to eighth relationships as follows. The first relationship of $T10<T11$ is satisfied, where $T10$ indicates an average thickness of the central basic cell walls, and $T11$ indicates an average thickness of the central reinforced cell walls. The second relationship of $T20<T21$ is satisfied, where $T20$ indicates an average thickness of the outer circumferential basic cell walls, and $T21$ indicates an average thickness of the outer circumferential reinforced cell walls. The third relationship of $R1/P1 \geq 0.5$ is satisfied, where $P1$ indicates an average cell pitch of the cells in the central part, and R1 is previously defined. The fourth relationship of $R2/P2 \geq 0.5$ is satisfied, where P2 indicates an average cell pitch of the cells in the outer circumferential part, and R2 is previously defined. The fifth relationship of $T10 \leq T20$ is satisfied, where T10 and T20 are previously defined. The sixth relationship of $T11 > T21$ is satisfied, where T11 and T21 are previously defined. The seventh relationship of $T3 > T10$ and $T3 > T20$ is satisfied, where T3 indicates an average thickness of the boundary partition wall, and T10 and T20 are previously defined. The eighth relationship of $T3 \geq T11$ and $T3 > T21$ is satisfied, where T3, T11 and T21 are previously defined.

The honeycomb structural body has a structure in which a density of the outer circumferential part is lower than a density of the cells in the central part when observed in a cross section which is perpendicular to an axial direction of the honeycomb structural body. In particular, the honeycomb structural body satisfies the relationship of $T10 \leq T20$, where T10 indicates an average thickness of the central basic cell walls and T20 indicates an average thickness of the outer circumferential basic cell walls.

That is, because the outer circumferential part has the cell density which is lower than the cell density of the central part, the average thickness T20 of the outer circumferential basic cell walls is formed to be equal to or larger than the average thickness T10 of the central basic cell walls in order to adequately keep the strength of the outer circumferential part. This structure makes it possible to maintain a structural balance between the entire honeycomb structural body, in other words, a balance in strength between the central part and the outer circumferential part.

In addition, the honeycomb structural body satisfies the relationship of $T3 > T10$ and $T3 > T20$, where T3 indicates an average thickness of the boundary partition wall, and T10 and T20 are previously defined. That is, the average thickness T3 of the boundary partition wall is larger than the average thickness T20 of the outer circumferential basic cell walls. It is recognized and known that stress is generated and external stress is applied to and concentrated at a neighbor area of the boundary partition wall when the honeycomb structural body is assembled and mounted to an exhaust gas pipe for an internal combustion engine. Because the average thickness T3 of the boundary partition wall is increased in the honeycomb structural body, it is possible to increase a rigidity of the boundary partition wall at which the stress is concentrated. This structure makes it possible to increase the strength (for example, the isostatic strength) of the honeycomb structural body.

Further, the cell walls in the central part are comprised of the central basic cell walls and the central reinforced cell walls. The central reinforced cell walls in the central reinforced part surround all of the cells having an opening part in the central reinforced area. In addition, the cell walls in the outer circumferential part are comprised of the outer circumferential basic cell walls and the outer circumferential reinforced cell walls. The outer circumferential reinforced cell walls surround all of the cells having an opening part in the outer circumferential reinforced part.

Still further, the honeycomb structural body satisfies the relationship of $T10 < T11$. T10 indicates the average thickness of the central basic cell walls and T11 indicates the average thickness of the central reinforced cell walls. Still further, the honeycomb structural body satisfies the relationship of $T20 < T21$. T20 indicates an average thickness of the outer circumferential basic cell walls and T21 indicates an average thickness of the outer circumferential reinforced cell walls.

That is, the central part and the outer circumferential part have the central reinforced area and the outer circumferential reinforced area, respectively, which are comprised of the cell walls having an increased cell thickness. The central reinforced area and the outer circumferential reinforced area are formed within a constant distance measured from the boundary partition wall. This structure makes it possible to further increase the strength of the boundary partition wall and a neighbor area of the boundary partition wall by the formation of the central reinforced area and the outer circumferential reinforced area, where, external stress is applied to and concentrated at the boundary partition wall and the neighbor area of the boundary partition wall. During a shaping process in a manufacturing of the honeycomb structural body, this structure makes it possible to suppress a flow rate and a flow amount of raw material fed to an extruding die and generation of defect of shape of the boundary partition wall and the neighbor cell walls of the boundary partition wall.

In addition, the honeycomb structural body according to the present invention satisfies a relationship of $R1/P1 \geq 0.5$ and a relationship of $R2/P2 \geq 0.5$, where as previously described, P1 indicates the average cell pitch of the cells in the central part, P2 indicates the average cell pitch of the cells in the outer circumferential part, and R2 is previously defined. That is, R1 is used for determining the central reinforced area, and R1 indicates a distance measured from the boundary partition wall toward a radially inward direction of a cross section which is perpendicular to an axial direction of the honeycomb structural body. R2 is used for determining the outer circumferential reinforced area, and R2 indicates a distance measured from the boundary partition wall toward a radially outward direction of the cross section. That is, the central reinforced area has not less than 0.5 cells inside from the boundary partition wall, and the outer circumferential reinforced area has not less than 0.5 cells outside from the boundary partition wall. The central reinforced area is comprised of the cell walls having an increased thickness inside from the boundary partition wall. Similarly, the outer circumferential reinforced area is comprised of the cell walls having an increased thickness outside from the boundary partition wall. This structure makes it possible to increase the strength of the honeycomb structural body.

Still further, the honeycomb structural body according to the present invention satisfies a relationship of $T11 > T21$. T11 indicates the average thickness of the central reinforced cell walls and T21 indicates the average thickness of the outer circumferential reinforced cell walls. That is, in the structure of the honeycomb structural body, the average thickness T11 of the central reinforced cell walls is greater than the average thickness T21 of the outer circumferential reinforced cell walls. This structure makes it possible to increase the strength of the boundary partition wall and the neighbor area of the boundary partition wall to which external stress is concentrated. Still further, this structure makes it possible to further increase the strength of the boundary partition wall and the neighbor area of the boundary partition wall by the formation of the central reinforced area and the outer circumferential reinforced area, where, external stress is applied to and concentrated at the neighbor area of the boundary partition wall. During a shaping process in manufacturing of the honeycomb structural body, this structure makes it possible to suppress a flow rate and a flow amount of raw material fed to an extruding die and suppress generation of defect of shape of the boundary partition wall and the neighbor cell walls of the boundary partition wall.

That is, during the shaping process in the manufacturing of the honeycomb structural body, because an insufficient amount of raw material is fed through the extruding die to the boundary partition wall and the area around the boundary partition wall having an increased thickness of the cell walls, there is a possibility of causing structural defects such as defects in shape. In order to compensate a shortage amount of raw material, it is necessary to provide a surplus amount of raw material to the boundary partition wall from the side of the central reinforced cell walls and the side of the outer circumferential reinforced cell walls around the boundary partition wall. In this case, when an area has an increased cell density, the amount of raw material fed toward a lateral direction in a direction perpendicular to the extruding direction in a feeding path of the extruding die is decreased. It is therefore possible to improve the flowing efficiency of the raw material by increasing a feeding rate of the raw material to the central area having the high cell density and providing surplus raw material to the boundary partition wall.

When the average thickness T11 of the central reinforced cell walls and the average thickness T21 of the outer circumferential reinforced cell walls satisfy the relationship of T11>T21, it is possible to reliably feed an adequate amount of surplus raw material to the boundary partition wall from the central part side having a high cell density. This structure makes it possible to prevent lacking in feeding of raw material fed through the extruding die and prevent occurrence of generating defects of cell walls in the boundary partition wall and a neighbor area of the boundary partition wall.

Still further, the honeycomb structural body according to the present invention satisfies the relationship of T3≥T11 and T3>T21. T3 indicates an average thickness of the boundary partition wall, T11 indicates the average thickness of the central reinforced cell walls and T21 indicates the average thickness of the outer circumferential reinforced cell walls. That is, the honeycomb structural body according to the present invention has a structure in which the average thickness T3 of the boundary partition wall is equal to or greater than the average thickness T11 of the central reinforced cell walls, and greater than the average thickness T21 of the outer circumferential reinforced cell walls. This makes it possible to increase a rigidity of the boundary partition wall when compared with a rigidity of the outer circumferential reinforced cell walls through which external stress (which is applied to the outer circumferential side) is transmitted to the boundary partition wall. Still further, because the thickness of the central reinforced cell walls is equal to or smaller than the thickness of the boundary partition wall, where the central reinforced cell walls supply a counterforce of the external stress (which is applied to the outer circumferential side) to the boundary partition wall, it is possible to suppress increasing of the counterforce. This makes it possible to prevent generation of defects and cracks in the boundary partition wall, and therefore to increase the overall strength of the honeycomb structural body.

As previously described, the present invention can provide the honeycomb structural body having an increased strength while suppressing generation of defects and cracks in the honeycomb structural body.

BRIEF DESCRIPTION OF THE DRAWINGS

A preferred, non-limiting embodiment of the present invention will be described by way of example with reference to the accompanying drawings, in which.

DETAILED DESCRIPTION OF THE PREFERRED EMBODIMENTS

Figure 1:
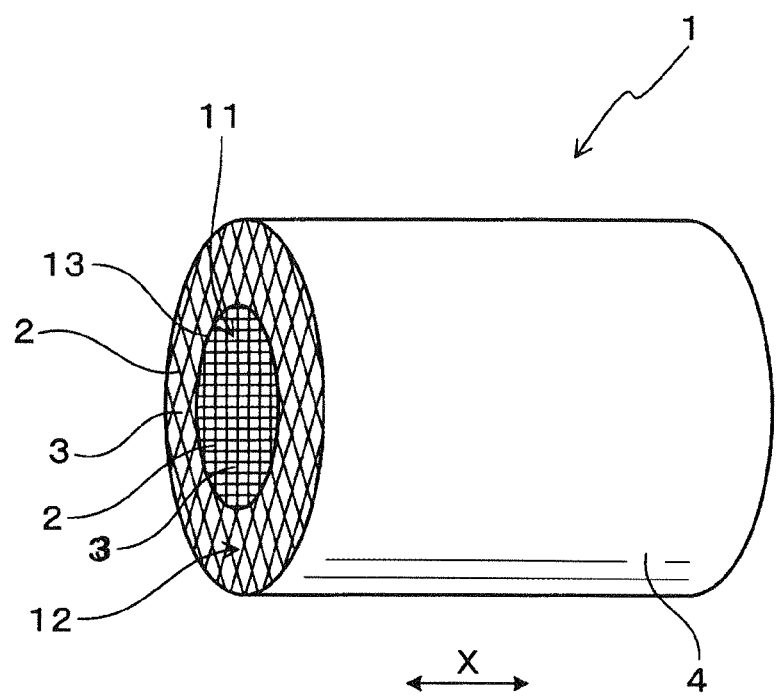
FIG. 1 is a perspective view showing an entire structure of a honeycomb structural body according to a first exemplary embodiment of the present invention.

Hereinafter, various embodiments of the present invention will be described with reference to the accompanying drawings. In the following description of the various embodiments, like reference characters or numerals designate like or equivalent component parts throughout the several diagrams.

Overview and Concept of the Present Invention

A description will be given of an overview and concept of a honeycomb structural body according to the present invention.

Figure 23A:
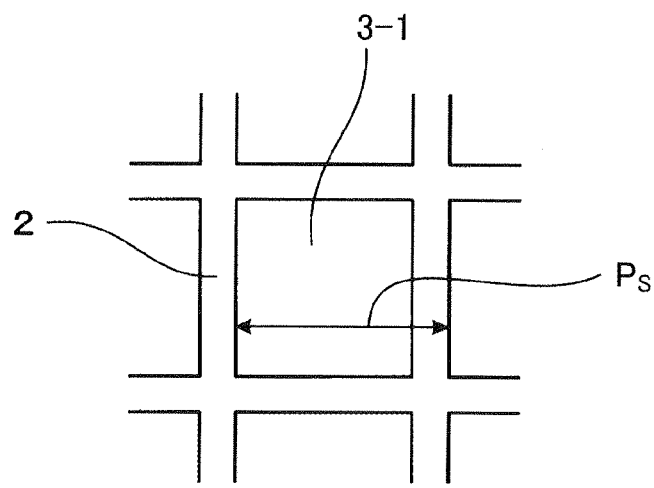
FIG. 23A is a view explaining a cell pitch $P_S$ in a central part and an outer circumferential part of a honeycomb structural body.
Figure 23B:
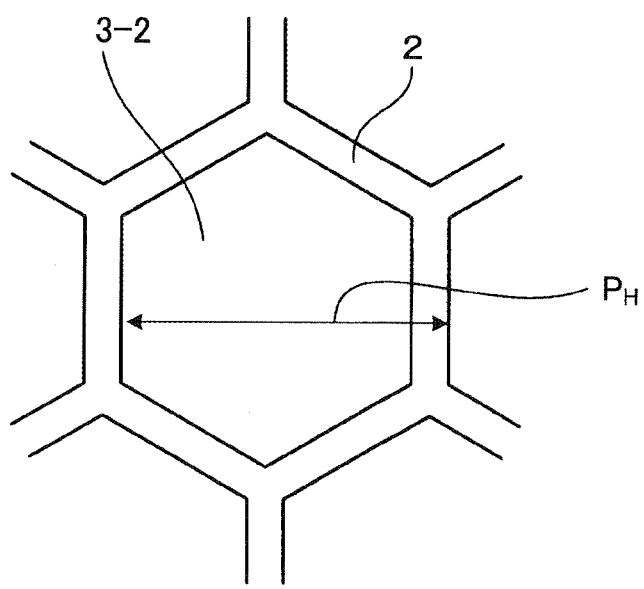
FIG. 23B is a view explaining another cell pitch $P_H$ in a central part and an outer circumferential part of a honeycomb structural body.

FIG. 23A is a view explaining a cell pitch $P_S$ in a central part and an outer circumferential part of a honeycomb structural body. FIG. 23b is a view explaining another cell pitch $P_H$ in a central part and an outer circumferential part of a honeycomb structural body.

In the structure of the honeycomb structural body, a cell pitch of cells in a central part and an outer circumferential part is a distance between cells adjacently arranged in the honeycomb structural body. For example, as shown in FIG. 23A, when a cross section of a rectangle cell 3-1 has a rectangle shape, reference character "$P_S$" indicates the cell pitch of the cell 3-1. On the other hand, as shown in FIG. 23B, when a cross section of a hexagonal cell 3-2 has a hexagonal shape, reference character "$P_H$" indicates the cell pitch of the cell 3.

The following method calculated the average thickness T3 of the boundary partition wall, the average thickness T10 of the central basic cell walls, the average thickness T11 of the central reinforced cell walls, the average thickness T20 of the outer circumferential basic cell walls, and the average thickness T21 of the outer circumferential reinforced cell walls. That is, a thickness of each of a plurality of detection points thereon was detected and an average thickness thereof. Similarly, the following method calculated the average cell pitch P1 of the cells in the central part and the average cell pitch P2 of the cells in the outer circumferential part were calculated by the following method. That is, a cell pitch of each of a plurality of detection points was detected and an average cell pitch thereof was calculated.

It is preferable that the honeycomb structural body according to the present invention satisfies a relationship of 1<T11/T21<2.5. As previously described, T11 indicates the average thickness of the central reinforced cell walls and T21 indicates the average thickness of the outer circumferential reinforced cell walls.

This structure makes it possible to suppress variation in flow speed and amount of raw material which is fed through the extruding die during manufacturing of the honeycomb structural body. In addition, when a thickness of each cell wall is simply increased, there is a possibility of decreasing rapid activation of catalyst because of increasing an entire mass of a honeycomb structural body and a possibility of increasing a pressure loss. It is possible to avoid such a drawback by adjusting a thickness of the cell walls in each of the central reinforced cell walls in the central reinforced area and the outer circumferential reinforced cell walls in the outer circumferential reinforced area. This makes it possible to suppress generation of cells clogged by catalyst in a catalyst coating process which is performed after completion of necessary processes (omitted here) following a raw material feeding process, and increasing of a pressure loss to be caused by the clogged cells. In addition, it is possible to suppress increasing of the entire mass of the honeycomb structural body. This makes it possible to provide the honeycomb structural body having a performance of purifying exhaust gas and rapid activation of the catalyst.

When a honeycomb structural body has a relationship of T11/T21<1, it is difficult to obtain the effect of suppressing variation in flow speed and amount of raw material feeding through an extruding die by supplying surplus raw material from the central part having a high cell density to the boundary partition wall during manufacturing of the honeycomb structural body. Furthermore, it is difficult to disperse external stress.

Still further, when a honeycomb structural body has a relationship of T11/T21≥2.5, although it is possible to obtain the effects for suppressing generation of defects of cell walls and increasing the strength of the honeycomb structural body, there is a possibility that cells are clogged with catalyst during a catalyst coating process which is performed after the shaping process, a pressure loss of the honeycomb structural body is increased and an exhaust gas purifying performance is deteriorated because of decreasing an opening ratio of the cells formed in the central reinforced area. Further, there is a possibility of decreasing rapid activation characteristics of the catalyst because of increasing the entire mass of the honeycomb structural body. In addition, there is a possibility of it being difficult to have a uniform flow of exhaust gas in the inside area and the outside area divided by the boundary partition wall in the honeycomb structural body because of decreasing an opening ratio of the cells formed by the central reinforced cells walls in the central reinforced area and increasing the pressure loss thereof.

It is preferable that the honeycomb structural body according to the present invention satisfies a relationship of $1 \leq T3/T11 < 2.5$ and a relationship of $1 < T3/T21 < 2.5$. This structure makes it possible to suppress variation in flow speed and amount of raw material which is fed through the extruding die in an area between the boundary partition wall and the central reinforced cell walls and an area between the boundary partition wall and the outer circumferential reinforced cell walls during manufacturing of the honeycomb structural body. This structure further makes it possible to effectively prevent generation of defects of cell walls in these areas. Further, it is possible to prevent cracks in the honeycomb structural body caused by thermal stress when the honeycomb structural body having catalyst is mounted to an exhaust gas pipe of an internal combustion engine of a motor vehicle and a temperature of exhaust gas emitted from the internal combustion engine is changed. That is, it is possible to decrease a difference in thermal capacity between the boundary partition wall and the central reinforced cell walls because of decreasing a difference in thickness between the boundary partition wall and the central reinforced cell walls. Furthermore, it is possible to suppress generation of thermal stress and cracks caused by the thermal stress because of suppressing a difference in temperature between the boundary partition wall and the central reinforced cell walls when the honeycomb structural body having the catalyst is mounted to the exhaust gas pipe of the internal combustion engine of the motor vehicle.

When a honeycomb structural body has a relationship of $T3/T11 < 1$, because the thickness of the central reinforced cell walls, which provides a counterforce of an external stress (supplied from the outer circumferential side) acting on the boundary partition wall, is larger than the thickness of the boundary partition wall, the central reinforced cell walls provides a surplus counterforce of the external stress acting on the boundary partition wall. This easily causes generation of cracks in the boundary partition wall, and this decreases the entre strength of the honeycomb structural body.

On the other hand, when a honeycomb structural body has a relationship of $T3/T11 \geq 2.5$, although it is possible to obtain the effect of suppressing occurrence of defects in cell walls and increasing the strength of the honeycomb structural body, there is a possibility of increasing a difference in thickness between the boundary partition wall and the central reinforced cell walls, and as a result of increasing a difference in thermal capacity between them. Further, this causes a possibility of easily increasing a difference in temperature between the boundary partition wall and the central reinforced cell walls when the honeycomb structural body having the catalyst is mounted to the exhaust gas pipe of the internal combustion engine of the motor vehicle. As a result, there is a possibility of generating cracks caused by the thermal stress.

When a honeycomb structural body has a relationship of $T3/T21 \leq 1$, because a thickness of the boundary partition wall for receiving a stress is equal to or smaller than a thickness of the outer circumferential reinforced cell walls, to which external stress applied to the outer circumferential side) is transmitted, the boundary partition wall has a low rigidity and it is difficult to suppress generation of cracks in the boundary partition wall. This causes a possibility of decreasing the overall strength of the honeycomb structural body.

On the other hand, when a honeycomb structural body has a relationship of $T3/T21 \geq 2.5$, although it is possible to obtain the effect of suppressing occurrence of defects in cell walls and increasing the strength of the honeycomb structural body, there is a possibility of increasing a difference in thickness between the boundary partition wall and the central reinforced cell walls, and as a result increasing a difference in thermal capacity between them. Further, this causes a possibility of easily increasing a difference in temperature between the boundary partition wall and the central reinforced cell walls when the honeycomb structural body having the catalyst is mounted to the exhaust gas pipe of the internal combustion engine of the motor vehicle. As a result, there is a possibility of generating cracks caused by the thermal stress.

It is preferable for the honeycomb structural body according to the present invention satisfies the relationship of $1 \leq T11/T10 < 3$ and the relationship of $1 < T21/T20 < 2.5$. As previously described, T10 indicates the average thickness of the central basic cell walls, T11 indicates the average thickness of the central reinforced cell walls, T20 indicates the average thickness of the outer circumferential basic cell walls and T21 indicates the average thickness of the outer circumferential reinforced cell walls.

This structure makes it possible to suppress variation in flow speed and amount of raw material which is fed through the extruding die during manufacturing of the honeycomb structural body. This makes it possible to suppress generation of cells clogged by catalyst in a catalyst coating process which is performed after completion of necessary processes (omitted here) following a raw material feeding process, and increasing of a pressure loss to be caused by the clogged cells. Further, this makes it possible to avoid increasing of a pressure loss caused by the clogged cells. In addition, it is possible to suppress increasing of the entire mass of the honeycomb structural body. This makes it possible to provide the honeycomb structural body having good exhaust gas purifying performance and rapid activation of the catalyst.

When a honeycomb structural body has a relationship of $T11/T10 \leq 1$, it is difficult to obtain the effect for suppressing variation in flow speed and amount of raw material which is fed through the extruding die by feeding the surplus raw material from the central part having a high cell density to the boundary partition wall side and further difficult to obtain the effect for dispersing external stress.

On the other hand, when a honeycomb structural body has a relationship of $T11/T10 \geq 3$, although it is possible to obtain the effect for suppressing generation of defects of cell walls and increase the strength of the honeycomb structural body, there is a possibility that cells are clogged by catalyst in a catalyst coating process as a latter process, a pressure loss is increased and an exhaust gas purifying performance is deteriorated because of decreasing an opening ratio of the cells formed in the central reinforced area. Further, there is a possibility of decreasing the rapid activation characteristics of the catalyst because of increasing the entire mass of the honeycomb structural body. In addition, there is a possibility of it being difficult to have a uniform flow of exhaust gas in the inside area and the outside area divided by the boundary partition wall in the honeycomb structural body because of decreasing an opening ratio of the cells formed by the central reinforced cells walls in the central reinforced area and increasing the pressure loss thereof.

When a honeycomb structural body has a relationship of $T21/T20 \leq 1$, it is difficult to obtain the effect for dispersing external stress.

On the other hand, when a honeycomb structural body has a relationship of $T21/T20 \geq 2.5$, although it is possible to obtain the effect for suppressing generation of defects of cell walls and increase the strength of the honeycomb structural body, there is a possibility of decreasing the rapid activation characteristics of the catalyst because of increasing the entire mass of the honeycomb structural body. In addition, there is a possibility of it being difficult to have a uniform flow of exhaust gas in the inside area and the outside area divided by the boundary partition wall in the honeycomb structural body because of decreasing an opening ratio of the cells formed by the central reinforced cells walls in the central reinforced area and increasing the pressure loss thereof.

Furthermore, it is preferable for the honeycomb structural body according to the present invention to satisfy the relationship of $0.5 \leq R1/P1 \leq 5$ and the relationship of $0.5 \leq R2/P2 \leq 5$. As previously described, P1 indicates the average cell pitch of the cells in the central part, P2 indicates the average cell pitch of the cells in the outer circumferential part, R1 indicates the distance measured from the boundary partition wall toward a radially inward direction of a cross section which is perpendicular to an axial direction of the honeycomb structural body, R2 indicates the distance measured from the boundary partition wall toward a radially outward direction of the cross section.

Further, it is more preferable for the honeycomb structural body according to the present invention to satisfy the relationship of $2 \leq R1/P1 \leq 4$. Still further, it is more preferable for the honeycomb structural body according to the present invention to satisfy the relationship of $1 \leq R2/P2 \leq 2$.

This structure makes it possible to adequately increase the overall strength of the honeycomb structural body while suppressing the increase of the entire weight of the honeycomb structural body caused by the formation of the center reinforced cell walls and the outer circumferential reinforced cell walls.

When a honeycomb structural body has a relationship of $R1/P1<0.5$ and a relationship of $R2/P2<0.5$, there is a possibility for it being difficult to obtain the effect for dispersing external stress and adequately increasing the strength of the honeycomb structural body.

On the other hand, when a honeycomb structural body has a relationship of $R1/P1>5$ and a relationship of $R2/P2>5$, there is a possibility of saturating the effect to increase the strength of the honeycomb structural body, and increasing a thermal capacity of the honeycomb structural body caused by forming the central reinforced cell walls and the outer circumferential reinforced cell walls. As a result, there is a possibility of deteriorating rapid temperature rising performance of the honeycomb structural body which is necessary for quickly activating the catalyst supported by the honeycomb structural body.

Further, it is preferable for the central basic cell walls in the honeycomb structural body to have the average thickness T10 of not more than 0.12 mm, and more preferable to have the average thickness T10 of not more than 0.1 mm.

Still further, it is preferable for the outer circumferential basic cell walls in the honeycomb structural body to have the average thickness T20 of not more than 0.14 mm, and more preferable to have the average thickness T10 of not more than 0.11 mm.

This structure makes it possible to effectively show the effects previously described because the honeycomb structural body has the structure in which the central basic cell walls and the outer circumferential basic cell walls have a small thickness when compared with the central reinforced cell walls and the outer circumferential reinforced cell walls, and the strength of the honeycomb structural body can be increased while suppressing generation of defects of the cell walls. Still further, it is possible for the honeycomb structural body to have the effects, as previously described, for effectively supporting catalyst therein and providing an excellent exhaust gas purifying performance and a low pressure loss.

First Exemplary Embodiment

A description will be given of a honeycomb structural body 1 according to a first exemplary embodiment with reference to FIG. 1 and FIG. 2.

FIG. 1 is a perspective view showing an entire structure of the honeycomb structural body 1 according to the first exemplary embodiment. FIG. 2 is a partial cross section showing a structure of a central part 11, an outer circumferential part 12 and a boundary partition wall 13 in the honeycomb structural body 1. The partial cross section shown in FIG. 2 is perpendicular to an axial direction of the honeycomb structural body 1 according to the first exemplary embodiment shown in FIG. 1.

Figure 2:
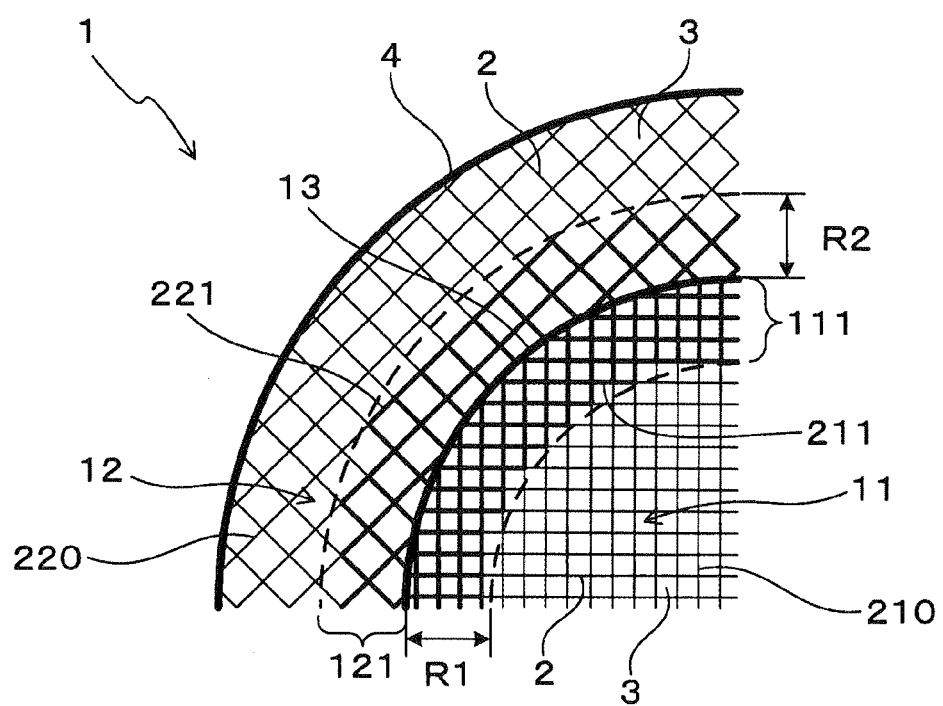
FIG. 2 is a partial cross section perpendicular to an axial direction of the honeycomb structural body according to the first exemplary embodiment shown in FIG. 1, which shows a structure of a central part, an outer circumferential part and a boundary partition wall in the honeycomb structural body.

As shown in FIG. 1 and FIG. 2, the honeycomb structural body 1 according to the first exemplary embodiment has the cell walls 2 arranged in a lattice shape and a plurality of the cells 3 which are surrounded by the cell walls 2.

In addition, the honeycomb structural body 1 is comprised of the central part 11 and the outer circumferential part 12. In a cross section which is perpendicular to an axial direction X (see FIG. 1) of the honeycomb structural body 1, the central part 11 contains a central axis of the honeycomb structural body 1. The cells 12 formed in the outer circumferential part 12 have a cell density which is lower than a cell density of the cells in the central part 11. The outer circumferential part 12 is formed at an outside of the central part 11 so that the outer circumferential part 12 covers the central part 11 in a cross section along an axial direction of the honeycomb structural body 1. Further, as shown in FIG. 1 and FIG. 2, the boundary partition wall 13 is formed between the central part 11 and the outer circumferential part 12.

As shown in FIG. 2, the cell walls 2 in the central part 11 are comprised of the central basic cell walls 210 and central reinforced cell walls 211. The central reinforced cell walls 211 are formed in a central reinforced area 111 measured from the boundary partition wall 13 by a distance R1 toward a radially inward direction of a cross section which is perpendicular to an axial direction of the honeycomb structural body 1. The central reinforced cell walls 211 surround all of cells the having an opening part in the central reinforced area 111.

The cell walls 2 in the outer circumferential part 12 are comprised of outer circumferential basic cell walls 220 and outer circumferential reinforced cell walls 221. The outer circumferential reinforced cell walls 221 are formed in an outer circumferential reinforced area 121 measured from the boundary partition wall 13 by a distance R2 toward a radially outward direction of the cross section. The outer circumferential reinforced cell walls 221 surround all of the cells having an opening part in the outer circumferential reinforced area 121.

As shown in FIG. 2, the honeycomb structural body 1 according to the first exemplary embodiment satisfies a relationship of $T10<T11$, where T10 indicates an average thickness of the central basic cell walls 210 and T11 indicates an average thickness of the central reinforced cell walls 211. Further, the honeycomb structural body 1 according to the first exemplary embodiment satisfies a relationship of $T20<T21$, where T20 indicates an average thickness of the outer circumferential basic cell walls 220 and T21 indicates an average thickness of the outer circumferential reinforced cell walls 221. Still further, the honeycomb structural body 1 according to the first exemplary embodiment satisfies a relationship of $R1/P1 \geq 0.5$, where P1 indicates an average cell pitch of the cells 3 in the central part 11 and R1 is previously defined. Still further, the honeycomb structural body 1 according to the first exemplary embodiment satisfies a relationship of R2/P2≥0.5, where P2 indicates an average cell pitch of the cells 3 in the outer circumferential part 12 and R2 is previously defined.

Furthermore, the honeycomb structural body 1 according to the first exemplary embodiment satisfies a relationship of T10≤T20, where T10 and T20 are previously defined. The honeycomb structural body 1 according to the first exemplary embodiment satisfies a relationship of T11>T21, where T11 and T21 are previously defined. Moreover, the honeycomb structural body 1 according to the first exemplary embodiment satisfies a relationship of T3>T10 and T3>T20, where T3 indicates an average thickness of the boundary partition wall 13 and T10 and T20 are previously defined. Finally, the honeycomb structural body 1 according to the first exemplary embodiment satisfies a relationship of T3≥T11 and T3>T21, where T3, T11 and T21 are previously defined.

A description will now be given of the honeycomb structural body 1 according to the first exemplary embodiment which satisfies the relationships previously described.

As shown in FIG. 1, the honeycomb structural body 1 according to the first exemplary embodiment is made of cordierite and is used for supporting catalyst capable of purifying exhaust gas emitted from an internal combustion engine, for example mounted to a motor vehicle.

The honeycomb structural body 1 according to the first exemplary embodiment is comprised of the cell walls 2 arranged in a lattice shape, a plurality of the cells 3 surrounded by the cell walls 2 and an outer circumferential wall 4. The outer circumferential surface of the honeycomb structural body 1 is covered with the outer circumferential wall 4. The cells 3 are formed along an axial direction of the honeycomb structural body 1. The cell walls 2, the cells 3 and the outer circumferential wall 4 are assembled to a monolithic body.

As shown in FIG. 2, the honeycomb structural body 1 is comprised of the central part 11 and the outer circumferential part 12. The central part 11 contains a central axis (not shown) when observed in a cross section which is perpendicular to an axial direction of the honeycomb structural body 1. The outside of the central part 11 is covered with the outer circumferential part 12. Further, the boundary partition wall 13. The boundary partition wall 13 has an average thickness T3 of 0.244 mm in the honeycomb structural body 1 according to the first exemplary embodiment.

The cells 3 formed in the central part 11 have a same cell density. The cells 3 formed in the outer circumferential part 12 have a same cell density. The cell density of the cells 3 formed in the central part 11 is larger than that of the cells 3 formed in the outer circumferential part 12. The cells 3 formed in the central part 11 and the cells 3 formed in the outer circumferential part 12 are arranged in a different direction. In the structure of the honeycomb structural body 1 according to the first exemplary embodiment, the cells 3 in the central part 11 are arranged in the direction which is different from the direction of the cells in the outer circumferential part 12 by 45 degrees. In other words, the cells 3 in the outer circumferential part 12 are inclined in direction to the cells 2 in the central part 11 by 45 degrees.

The central part 11 has the central reinforced area 111 which is formed within an area in a radially inward direction measured from the boundary partition wall 13 by the distance R1. The cells 3 having an opening part formed in the central reinforced area 111 are surrounded by the central reinforced cell walls 211. Other cells 3 formed in the central reinforced area 111 are surrounded by the central basic cell walls 210.

The honeycomb structural body 1 according to the first exemplary embodiment has the structure in which the average thickness T11 of the central reinforced cell walls 211 is larger than the average thickness T10 of the central basic cell walls 210 (T10<T11). In addition, the honeycomb structural body 1 according to the first exemplary embodiment satisfies a relationship of 1<T11/T10<3, where T10 indicates the average thickness of the central basic cell walls 210 and T11 indicates the average thickness of the central reinforced cell walls 211. In the structure of the honeycomb structural body 1 according to the first exemplary embodiment, the average thickness T10 of the central basic cell walls 210 is 0.095 mm and the average thickness T11 of the central reinforced cell walls 21 is 10.232 mm, and a value of T11/T10 is 2.44 (T11/T10=2.44).

Further, the distance R1 of the central part 11 is 3 mm, and the average cell pitch P1 of the cells 3 in the central part 11 is 1.04 mm. The honeycomb structural body 1 according to the first exemplary embodiment satisfies the relationship of 0.5≤R1/P1≤5. The honeycomb structural body 1 according to the first exemplary embodiment has the relationship of R1/P1=2.88.

The outer circumferential part 12 has the outer circumferential reinforced area 121 which is formed within an area in a radially outward direction measured from the boundary partition wall 13 by the distance R2. The cells 3 having a cell opening part formed in the outer circumferential reinforced area 121 are surrounded by the outer circumferential reinforced cell walls 221. Other cells 3 formed in the outer circumferential reinforced area 121 are surrounded by the outer circumferential basic cell walls 220.

The honeycomb structural body 1 according to the first exemplary embodiment has the structure in which the average thickness T21 of the outer circumferential reinforced cell walls 221 is larger than the average thickness T20 of the outer circumferential basic cell walls 220 (T20<T21).

In addition, the honeycomb structural body 1 according to the first exemplary embodiment satisfies a relationship of 1<T21/T20<2.5, where T20 indicates the average thickness of the outer circumferential basic cell walls 220 and T21 indicates the average thickness of the outer circumferential reinforced cell walls 221. In the structure of the honeycomb structural body 1 according to the first exemplary embodiment, the average thickness T20 of the outer circumferential basic cell walls 220 is 0.104 mm, the average thickness T21 of the outer circumferential reinforced cell walls 221 is 0.11 mm, a value of T21/T20 is 1.06 (T21/T20=1.06).

Further, the distance R2 of the outer circumferential part 12 is 5 mm, and the average cell pitch P2 of the cells 3 in the outer circumferential part 21 is 1.27 mm. The honeycomb structural body 1 according to the first exemplary embodiment satisfies the relationship of 0.5≤R2/P2≤5. The honeycomb structural body 1 according to the first exemplary embodiment has the relationship of R2/P2=3.94.

Further, the honeycomb structural body 1 according to the first exemplary embodiment satisfies the relationship of T10≤T20. In addition, the honeycomb structural body 1 according to the first exemplary embodiment satisfies the relationship of T11>T21. Still further, the honeycomb structural body 1 according to the first exemplary embodiment satisfies a relationship of 1<T11/T21<2.5. The honeycomb structural body 1 according to the first exemplary embodiment has the relationship of T11/T21=2.11.

In addition, the average thickness T3 of the boundary partition wall 13 is larger than the average thickness T10 of the central basic cell walls 210 and the average thickness T20 of the outer circumferential basic cell walls 220 (T3>T10, T3>T20).

The average thickness T3 of the boundary partition wall 13 is equal to or larger than the average thickness T11 of the central reinforced cell walls 211, and larger than the average thickness T21 of the outer circumferential reinforced cell walls 221 (T3≥T11 and T3>T21). Furthermore, the honeycomb structural body 1 according to the first exemplary embodiment satisfies a relationship of 1≤T3/T11<2.5 and 1<T3/T21<2.5.

Next, a description will now be given of a method of manufacturing the honeycomb structural body 1 according to the first exemplary embodiment.

It is possible to use a conventional method having production steps of manufacturing a honeycomb structural body.

At first, cordierite raw material of the honeycomb structural body 1 is extruded to obtain a green body having a honeycomb structural shape. Next, the obtained green body is divided to a plurality of divided parts having a predetermined length. Each of the divided green bodies is dried and fired to produce the honeycomb structural body 1 according to the first exemplary embodiment.

It is possible to use a metal die (not shown) having slit grooves corresponding to a shape of the cell walls 2 when an extrusion shaping process is performed. The slit grooves are formed by an electrical discharge machining, a laser processing, a slicing processing, etc.

A groove width of each of grooves in the extruding die, which correspond in shape to a pattern of the central reinforced cell walls 211 and the outer circumferential reinforced cell walls 221, becomes thicker when compared with a groove width of grooves corresponding in shape to other cell walls 2 because the central reinforced cell walls 211 and the outer circumferential reinforced cell walls 221 become thicker in the central reinforced area 111 and the outer circumferential reinforced area 121 divided by the boundary partition wall 13.

The wide groove width of these grooves in the extruding die can be formed by using electrical discharge machining (EDM), laser machining, etc. In addition, it is also possible to form these grooves having a wide groove width by performing an additional processing by using a laser machining, a fluid grinding, etc. after performing a usual slit groove machining.

Next, a description will now be given of the action and effects of the honeycomb structural body 1 according to the first exemplary embodiment.

In the structure of the honeycomb structural body 1 according to the first exemplary embodiment, the central part 11 and the outer circumferential part 12 are formed in a cross section which is perpendicular to an axial direction of the honeycomb structural body 1. In particular, the outer circumferential part 12 is lower in cell density than the central part 11. Further, the average thickness T10 of the central basic cell walls 210 and the average thickness T20 of the outer circumferential basic cell walls 220 satisfy the relationship of T10≤T20. Because the outer circumferential part 12 has a low cell density when compared with that of the central part 11, it is so formed that the average thickness T20 of the outer circumferential basic cell walls 220 is equal to or larger than the average thickness T10 of the central basic cell walls 210 in order that the outer circumferential part 12 has an adequate strength. Because this structure makes it possible to form the central part 11 and the outer circumferential part 12 in balance of strength, the honeycomb structural body 1 has a structure in balance of overall strength.

In the structure of the honeycomb structural body 1 according to the first exemplary embodiment, the average thickness T3 of the boundary partition wall 13, the average thickness T10 of the central basic cell walls 210 and the average thickness T20 of the outer circumferential basic cell walls 220 satisfy the relationship of T3>T10 and T3>T20. That is, the average thickness T3 of the boundary partition wall 13 is larger than the average thickness T10 of the central basic cell walls 210 and the average thickness T20 of the outer circumferential basic cell walls 220. It is recognized that an external stress is generated and concentrated at the boundary partition wall 13 and an area around the boundary partition wall 13 when the honeycomb structural body 1 is assembled to an exhaust gas pipe of an internal combustion engine. It is possible to increase a rigidity of the boundary partition wall 13, at which the external stress is concentrated, by increasing the average thickness T3 of the boundary partition wall 13. This structure makes it possible to increase the overall strength (for example, the isostatic strength) of the honeycomb structural body 1.

The cell walls 2 formed in the central part 11 are comprised of the central basic cell walls 210 and the central reinforced cell walls 211. The central reinforced cell walls 211 surround all of the cells 3 having an opening part in the central reinforced area 111. In addition, the cell walls 2 formed in the outer circumferential part 12 are comprised of the outer circumferential basic cell walls 220 and the outer circumferential reinforced cell walls 221. The outer circumferential reinforced cell walls 221 surround all of the cells 3 having an opening part in the outer circumferential reinforced area 121. Still further, the average thickness T10 of the central basic cell walls 210 and the average thickness T11 of the central reinforced cell walls 211 satisfy the relationship of T10<T11, and the average thickness T20 of the outer circumferential basic cell walls 220 and the average thickness T21 of the outer circumferential reinforced cell walls 221 satisfy the relationship of T20<T21.

That is, the central part 11 and the outer circumferential part 12 have the central reinforced area 111 and the outer circumferential reinforced area 121, respectively, and the central reinforced area 111 have the central reinforced cell walls 211 having an increased thickness and the outer circumferential reinforced area 121 have the outer circumferential reinforced cell walls 221 having an increased thickness when compared with the cell thickness of the other cell walls 2. This structure makes it possible to effectively increase the strength of the boundary partition wall 13 and the area around the boundary partition wall 13 to which external stress is applied and concentrated. Still further, this structure makes it possible to suppress variation in flow speed and amount of raw material which is fed through the extruding die during manufacturing of the honeycomb structural body 1, and prevent occurrence of generating defects of the cell walls 2 at the boundary partition wall 13 and the area around the boundary partition wall 13. This makes it possible to further increase the strength of the honeycomb structural body 1.

Furthermore, in the structure of the honeycomb structural body 1 according to the first exemplary embodiment, the relationship of R1/P1≥0.5 and R2/P2≥0.5 is satisfied between the distance R1 in the central part 11 which determines the range of the central reinforced area 111, the distance R2 in the outer circumferential part 12 which determined the range of the outer circumferential reinforced area 121, the average cell pitch P1 of the cells 3 formed in the central part 11 and the average cell pitch P2 of the cells 3 formed in the outer circumferential part 12. That is, the central reinforced area 111 is formed in an area of not less than 0.5 cells inward the boundary partition wall 13, and the outer circumferential reinforced area 121 is formed in an area of not less than 0.5 cells outward the boundary partition wall 13. This structure makes it possible to adequately form the central reinforced area 111 and the outer circumferential reinforced area 121, in which the reinforced cell walls 111 and 211 having an increased thickness are formed around the boundary partition wall 13. In other words, this structure makes it possible to have the effects of the present invention previously described.

Furthermore, in the structure of the honeycomb structural body 1 according to the first exemplary embodiment, the average thickness T11 of the central reinforced cell walls 211 and the average thickness T21 of the outer circumferential reinforced cell walls 221 satisfy the relationship of T11>T21. That is, the average thickness T11 of the central reinforced cell walls 211 is larger than the average thickness T21 of the outer circumferential reinforced cell walls 221. This structure makes it possible to effectively increase the strength of the boundary partition wall 13 and the area around the boundary partition wall 13 to which external stress is applied and concentrated. Further, this structure makes it possible to suppress variation in flow speed and amount of raw material which is fed through the extruding die during manufacturing of the honeycomb structural body 1, and prevent occurrence of generating defects of the cell walls 2 at the boundary partition wall 13 and the area around the boundary partition wall 13. This makes it possible to further increase the strength of the honeycomb structural body 1.

That is, during the shaping process in the manufacturing of the honeycomb structural body 1, because an insufficient amount of raw material fed through the extruding die is supplied to the boundary partition wall 13 and the neighbor area of the boundary partition wall 13 having an increased thickness of the cell walls 2, there is a possibility of causing defects in shape. In order to compensate a shortage amount of raw material, it is necessary to provide a surplus amount of raw material to the boundary partition wall 13 from the central reinforced cell walls 211 side and the outer circumferential reinforced cell walls 221 side around the boundary partition wall 13. In this case, when an area has an increased cell density, the amount of raw material fed toward a lateral direction in a direction perpendicular to the extruding direction in a feeding path of the extruding die is decreased. It is therefore possible to improve the flowing efficiency of the raw material by increasing a feeding rate of the raw material to the central area 11 having the high cell density and providing the surplus raw material to the boundary partition wall 13.

When the average thickness T11 of the central reinforced cell walls 211 and the average thickness T21 of the outer circumferential reinforced cell walls 221 satisfy the relationship of T11>T21, it is possible to reliably feed an adequate amount of surplus raw material to the boundary partition wall 13 from the central part 11 side having a high cell density. This structure makes it possible to prevent lacking in feeding of raw material fed through the extruding die, and prevent occurrence of generating defects of cell walls in the boundary partition wall 13 and the area around the boundary partition wall 13.

Still further, in the structure of the honeycomb structural body 1 according to the first exemplary embodiment, the average thickness T3 of the boundary partition wall 13, the average thickness T11 of the central reinforced cell walls 211 and the average thickness T21 of the outer circumferential reinforced cell walls 221 satisfy the relationship of T3≥T11 and T3>T21. That is, the honeycomb structural body 1 according to the first exemplary embodiment has the structure in which the average thickness T3 of the boundary partition wall 13 is equal to or greater than the average thickness T11 of the central reinforced cell walls 211, and greater than the average thickness T21 of the outer circumferential reinforced cell walls 221. This makes it possible to increase a rigidity of the boundary partition wall 13 when compared with a rigidity of the outer circumferential reinforced cell walls 221 through which external stress (which is applied to the outer circumferential side) is transmitted to the boundary partition wall 13. Still further, because the thickness of the central reinforced cell walls 211 is equal to or smaller than the thickness of the boundary partition wall 13, where the central reinforced cell walls supply a counterforce of the external stress (which is applied to the outer circumferential side) to the boundary partition wall 13, it is possible to suppress increasing of the counterforce. This makes it possible to prevent generation of defects and cracks in the boundary partition wall 13, and therefore to increase the overall strength of the honeycomb structural body 1.

In the structure of the honeycomb structural body 1 according to the first exemplary embodiment, average thickness T11 of the central reinforced cell walls 211 and the average thickness T21 of the outer circumferential reinforced cell walls 221 satisfy the relationship of 1<T11/T21<2.5. This structure makes it possible to suppress variation in flow speed and amount of raw material which is fed through the extruding die during manufacturing of the honeycomb structural body 1. In addition to this feature, it is possible to suppress generation of cells clogged by catalyst in a catalyst coating process which is performed after completion of necessary processes (omitted here) following a raw material feeding process. Further, this makes it possible to suppress increasing of a pressure loss to be caused by the clogged cells. In addition, it is possible to suppress increasing of the entire mass of the honeycomb structural body 1. This makes it possible to provide the honeycomb structural body 1 having an exhaust gas purifying performance and rapid activation of the catalyst.

In the structure of the honeycomb structural body 1 according to the first exemplary embodiment, the average thickness T3 of the boundary partition wall 13, the average thickness T11 of the central reinforced cell walls 211 and the average thickness T21 of the outer circumferential reinforced cell walls 221 satisfy the relationship of 1≤T3/T11<2.5 and 1<T3/T21<2.5. This structure makes it possible to suppress variation in flow speed and amount of raw material which is fed through the extruding die in an area between the boundary partition wall 13 and the central reinforced cell walls 211 and an area between the boundary partition wall 13 and the outer circumferential reinforced cell walls 221 during manufacturing of the honeycomb structural body 1. This structure further makes it possible to effectively prevent generation of defects of the cell walls in these areas. Further, it is possible to prevent cracks in the honeycomb structural body caused by thermal stress when the honeycomb structural body 1 having catalyst is mounted to an exhaust gas pipe of an internal combustion engine and a temperature of exhaust gas emitted from the internal combustion engine is changed. That is, it is possible to decrease a difference in thermal capacity between the boundary partition wall 13 and the central reinforced cell walls 211 because of decreasing a difference in thickness between the boundary partition wall 13 and the central reinforced cell walls 211. Furthermore, it is possible to suppress generation of thermal stress and cracks caused by the thermal stress because of suppressing a difference in temperature between the boundary partition wall 13 and the central reinforced cell walls 211 when the honeycomb structural body having the catalyst is mounted to the exhaust gas pipe of the internal combustion engine of the motor vehicle.

In the structure of the honeycomb structural body 1 according to the first exemplary embodiment, the average thickness T10 of the central basic cell walls 210, the average thickness T11 of the central reinforced cell walls 211 and the average thickness T21 of the outer circumferential reinforced cell walls 221 satisfy the relationship of $1 \leq T11/T10 < 3$ and $1 < T21/T20 < 2.5$. This structure makes it possible to suppress variation in flow speed and amount of raw material which is fed through the extruding die during manufacturing of the honeycomb structural body 1. This makes it possible to suppress generation of cells clogged by catalyst in a catalyst coating process which is performed after completion of necessary processes (omitted here) following a raw material feeding process, and increasing of a pressure loss to be caused by the clogged cells. Further, this makes it possible to avoid increasing of a pressure loss to be caused by the clogged cells. In addition, it is possible to suppress increasing of the entire mass of the honeycomb structural body 1. This makes it possible to provide the honeycomb structural body 1 having an exhaust gas purifying performance and rapid activation of the catalyst.

In the structure of the honeycomb structural body 1 according to the first exemplary embodiment, distance R1 in the central part 11, the distance R2 in the outer circumferential part 12, the average cell pitch P1 of the cells 3 formed in the central part 11 and the average cell pitch P2 of the cells 3 formed in the outer circumferential part 12 satisfy the relationship of $0.5 \leq R1/P1 \leq 5$ and $0.5 \leq R2/P2 \leq 5$. This structure makes it possible to adequately increase the overall strength of the honeycomb structural body while suppressing the increase of the entire weight of the honeycomb structural body 1 caused by the formation of the center reinforced cell walls 211 and the outer circumferential reinforced cell walls 221.

Still further, in the structure of the honeycomb structural body 1 according to the first exemplary embodiment, the central basic cell walls 210 has the average thickness T10 of not more than 0.12 mm, and the outer circumferential basic cell walls 220 has the average thickness T20 of not more than 0.14 mm. This structure makes it possible to effectively show the effects previously described because the honeycomb structural body has the structure in which the central basic cell walls 210 and the outer circumferential basic cell walls 220 have a small thickness when compared with the central reinforced cell walls 211 and the outer circumferential reinforced cell walls 221, and the strength of the honeycomb structural body 1 can be increased while suppressing generation of defects of the cell walls. Still further, it is possible for the honeycomb structural body 1 to have the effects, as previously described, for effectively supporting catalyst therein and providing an excellent exhaust gas purifying performance and a low pressure loss.

It is accordingly for the first exemplary embodiment to provide the honeycomb structural body 1 having an increased strength with suppressing generation of defects in shape of the cell walls 2.

Second Exemplary Embodiment

A description will now be given of honeycomb structural bodies according to a second exemplary embodiment with reference to FIG. 3 to FIG. 9. In particular, the second exemplary embodiment provides the central part 11 and the outer circumferential part 12 have a different structure.

Figure 3:
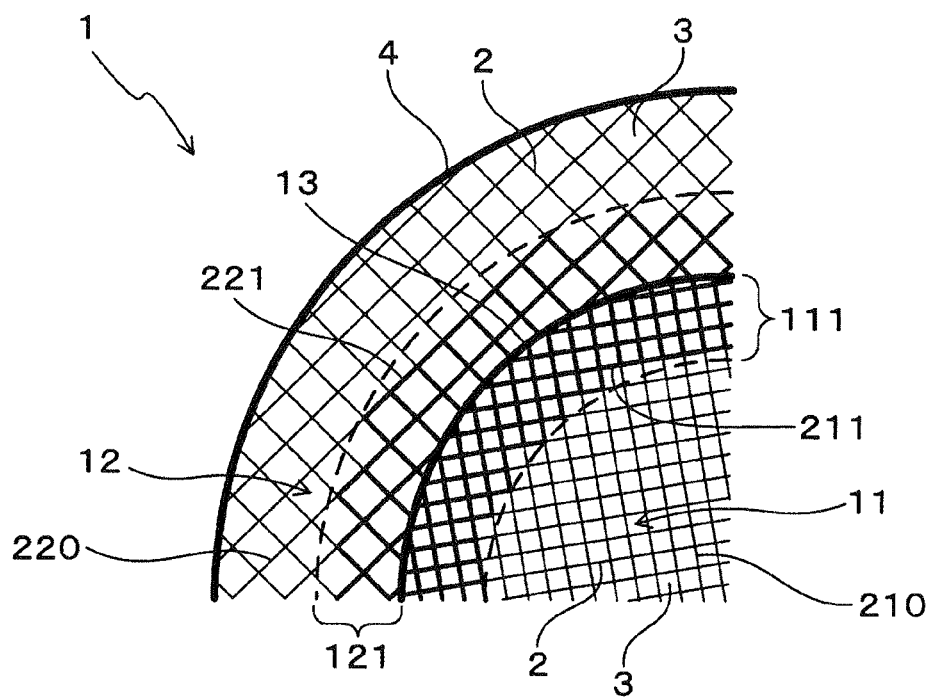
FIG. 3 is a partial cross section of the honeycomb structural body according to the second exemplary embodiment of the present invention, which is perpendicular to an axial direction of the honeycomb structural body and shows another structure of the central part, the outer circumferential part and the boundary partition wall.

FIG. 3 is a partial cross section of the honeycomb structural body according to the second exemplary embodiment, which is perpendicular to an axial direction of the honeycomb structural body. FIG. 3 shows the central part 11, the outer circumferential part 12 and the boundary partition wall 13 having another structure. In particular, as shown in FIG. 3, each of the cells 3 has a rectangle shape, and the cells 3 formed in the outer circumferential part 12 are inclined to the cells 3 formed in the central part 11 by 30 degrees.

Figure 4:
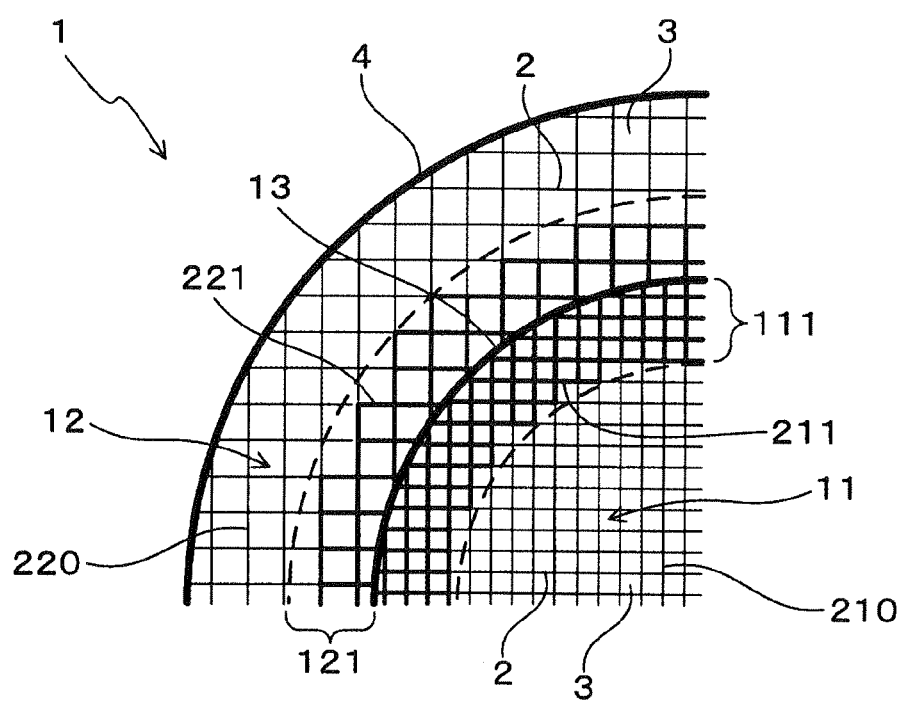
FIG. 4 is a partial cross section of the honeycomb structural body according to the second exemplary embodiment of the present invention, which is perpendicular to an axial direction of the honeycomb structural body and shows another structure of the central part, the outer circumferential part and the boundary partition wall.

FIG. 4 is a partial cross section of the honeycomb structural body according to the second exemplary embodiment, which is perpendicular to an axial direction of the honeycomb structural body. FIG. 4 shows the central part 11, the outer circumferential part 12 and the boundary partition wall 13 having another structure. In particular, as shown in FIG. 4, each of the cells 3 has a rectangle shape, and the cells 3 are formed in the same direction in the central part 11 and the outer circumferential part 12.

Figure 5:
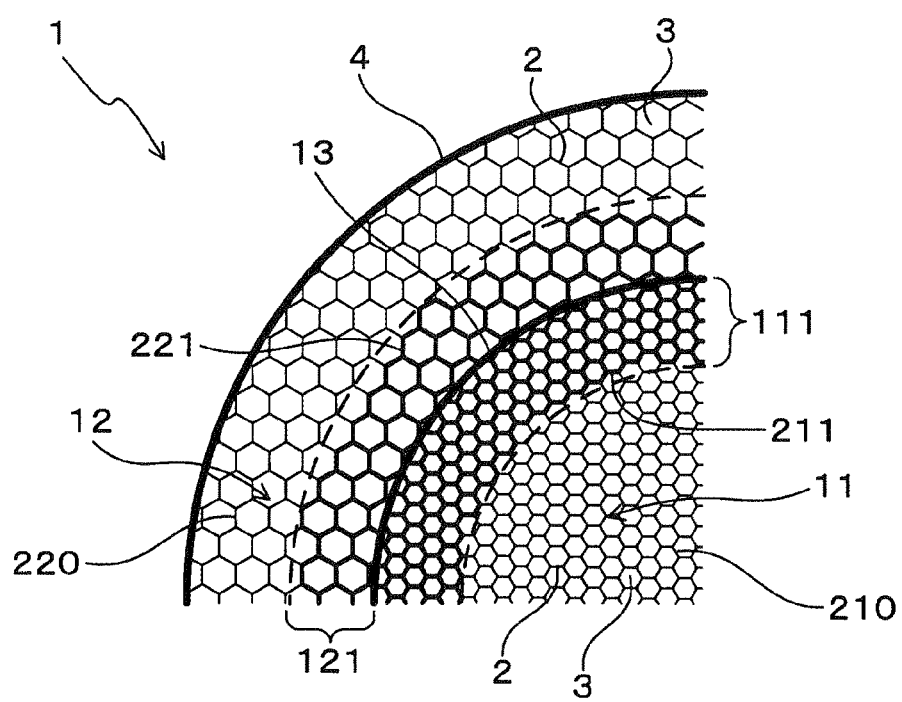
FIG. 5 is a partial cross section of the honeycomb structural body according to the second exemplary embodiment of the present invention, which is perpendicular to an axial direction of the honeycomb structural body and shows another structure of the central part, the outer circumferential part and the boundary partition wall.

FIG. 5 is a partial cross section of the honeycomb structural body according to the second exemplary embodiment, which is perpendicular to an axial direction of the honeycomb structural body. FIG. 5 shows the central part 11, the outer circumferential part 12 and the boundary partition wall 13 having another structure. In particular, as shown in FIG. 3, each of the cells 3 has a hexagonal shape, and the cells 3 formed in the outer circumferential part 12 are inclined to the cells 3 formed in the central part 11 by 30 degrees.

Figure 6:
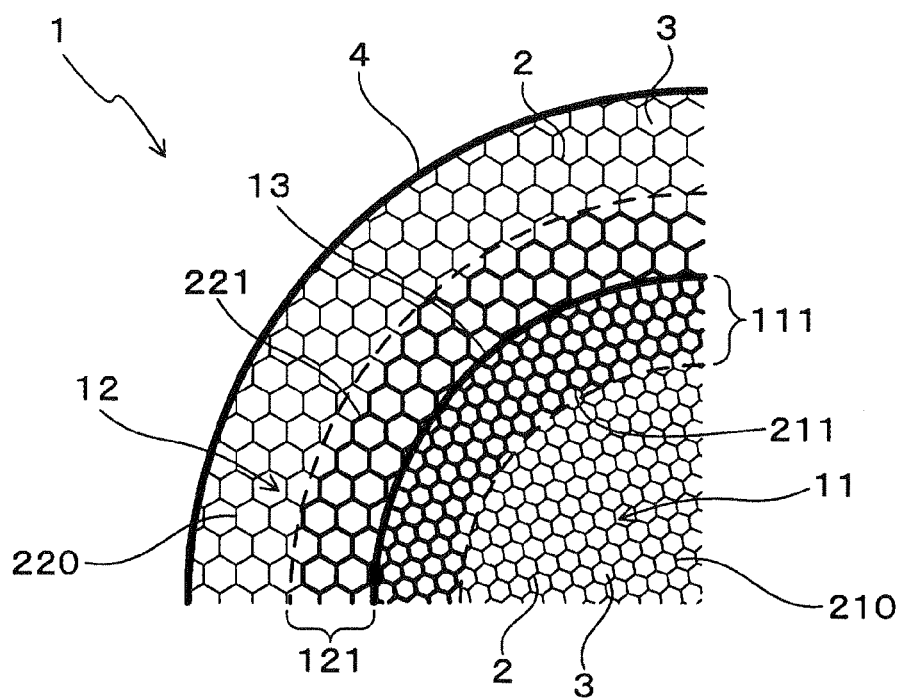
FIG. 6 is a partial cross section of the honeycomb structural body according to the second exemplary embodiment of the present invention, which is perpendicular to an axial direction of the honeycomb structural body and shows another structure of the central part, the outer circumferential part and the boundary partition wall.

FIG. 6 is a partial cross section of the honeycomb structural body according to the second exemplary embodiment, which is perpendicular to an axial direction of the honeycomb structural body. FIG. 6 shows the central part 11, the outer circumferential part 12 and the boundary partition wall 13 having another structure. In particular, as shown in FIG. 6, each of the cells 3 has a rectangle shape, and the cells 3 formed in the outer circumferential part 12 are inclined to the cells 3 formed in the central part 11 by 15 degrees.

Figure 7:
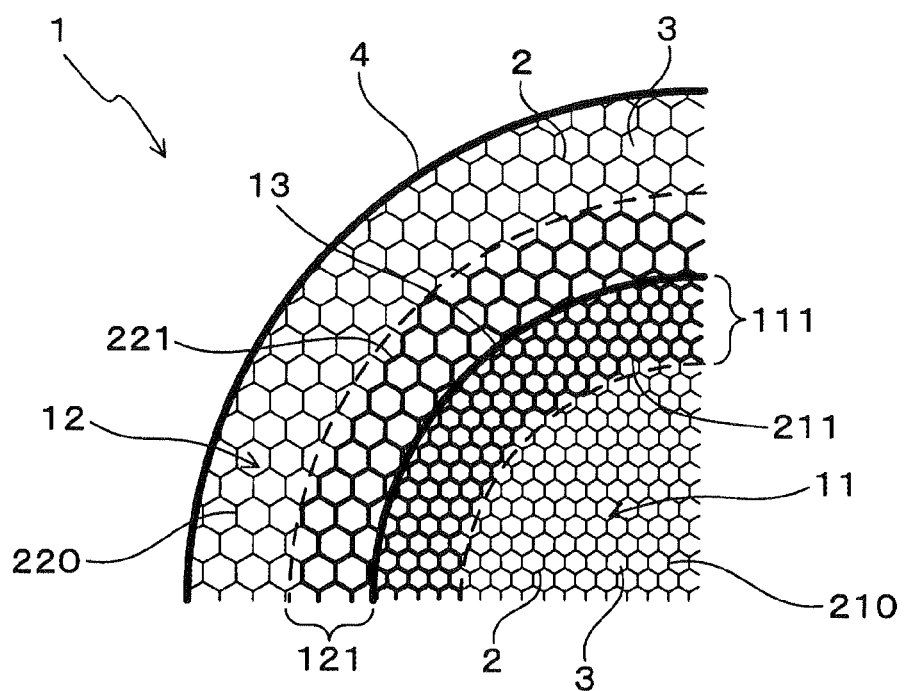
FIG. 7 is a partial cross section of the honeycomb structural body according to the second exemplary embodiment of the present invention, which is perpendicular to an axial direction of the honeycomb structural body and shows another structure of the central part, the outer circumferential part and the boundary partition wall.

FIG. 7 is a partial cross section of the honeycomb structural body according to the second exemplary embodiment, which is perpendicular to an axial direction of the honeycomb structural body. FIG. 7 shows the central part 11, the outer circumferential part 12 and the boundary partition wall 13 having another structure. In particular, as shown in FIG. 7, each of the cells 3 has a hexagonal shape, and the cells 3 are formed in the same direction in the central part 11 and the outer circumferential part 12.

The honeycomb structural bodies according to the second exemplary embodiment shown in FIG. 3 to FIG. 7 have the same basic structure of the components other than the central part 11, the outer circumferential part 12 and the boundary partition wall 13, and have the same action and effects of the honeycomb structural body according to the first exemplary embodiment.

The concept of the present invention is not limited by the shape of the cells 3 formed in the central part 11 and the outer circumferential part 12. It is possible for the cells to have an optional shape, for example, a triangle shape, a rectangle shape (which correspond to the first exemplary embodiment), a hexagonal shape (which correspond to the second exemplary embodiment), etc.

It is also possible for the central part 11 and the outer circumferential part 12 to have the cells 3 having a different shape or the same shape.

Still further, it is possible for the central part 11 and the outer circumferential part 12 to have the cells 3 which are formed in the same direction or a different direction. It is acceptable that the cells 3 formed in the central part 11 are inclined to the cells 3 formed in the outer circumferential part 12 by an optional angle.

It is also possible for the boundary partition wall 13 to have an optional shape, for example a circular shape, a rectangle shape, a hexagonal shape, etc.

Figure 8:
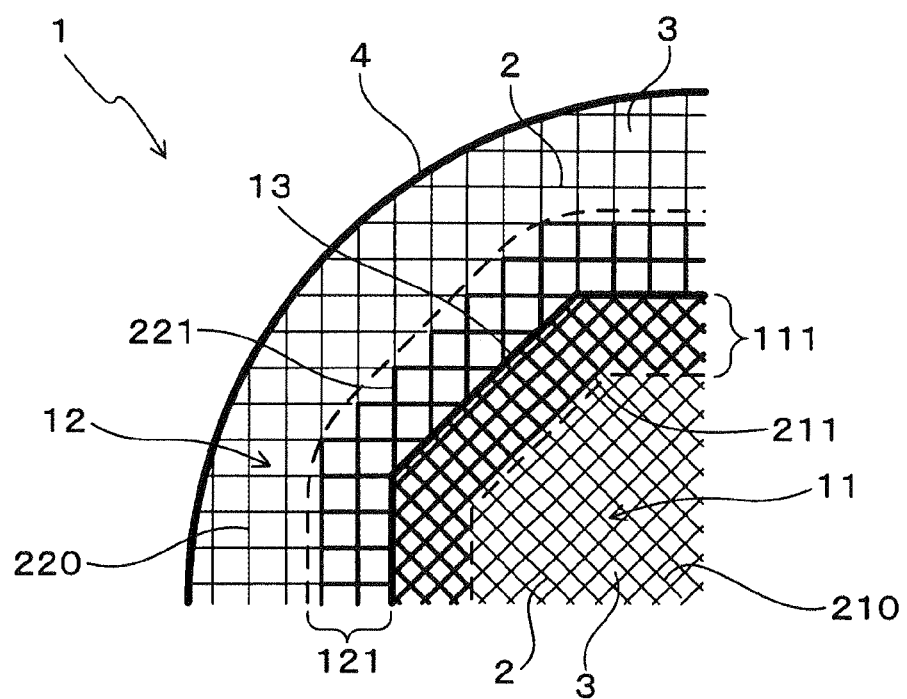
FIG. 8 is a partial cross section of the honeycomb structural body according to the second exemplary embodiment of the present invention, which is perpendicular to an axial direction of the honeycomb structural body and shows the boundary partition wall having an octagonal shape.

FIG. 8 is a partial cross section of the honeycomb structural body according to the second exemplary embodiment, which is perpendicular to an axial direction of the honeycomb structural body. FIG. 8 shows the boundary partition wall 13 having an octagonal shape. As shown in FIG. 8, the boundary partition wall 13 having an octagonal shape.

Figure 9:
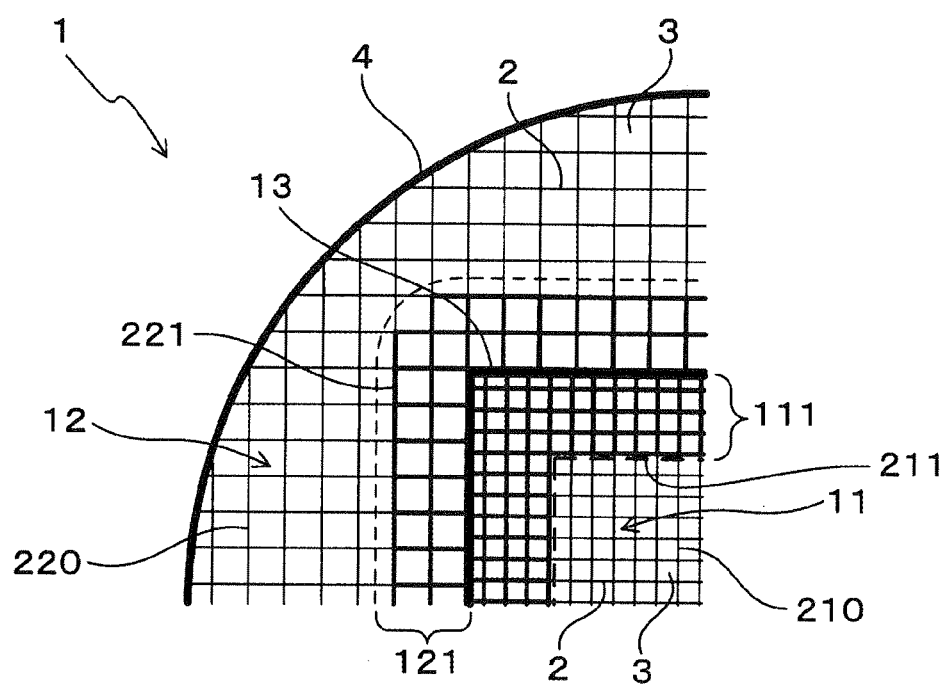
FIG. 9 is a partial cross section of the honeycomb structural body according to the second exemplary embodiment of the present invention, which is perpendicular to an axial direction of the honeycomb structural body and shows the boundary partition wall having a square shape.

FIG. 9 is a partial cross section of the honeycomb structural body according to the second exemplary embodiment, which is perpendicular to an axial direction of the honeycomb structural body. FIG. 9 shows the boundary partition wall 13 having a rectangle shape. As shown in FIG. 9, the boundary partition wall 13 having a square shape.

As shown in FIG. 8 and FIG. 9, when the boundary partition wall 13 has a polygonal shape, the outer circumferential reinforced area 121 satisfies the relationship in which the distance between the boundary partition wall 13 and the outer periphery of the outer circumferential reinforced area 121 always has the distance R2.

Third Exemplary Embodiment

A description will now be given of the third exemplary embodiment which evaluates the characteristics of the honeycomb structural body having various structures with reference to FIG. 10 and Table 1.

Figure 10:
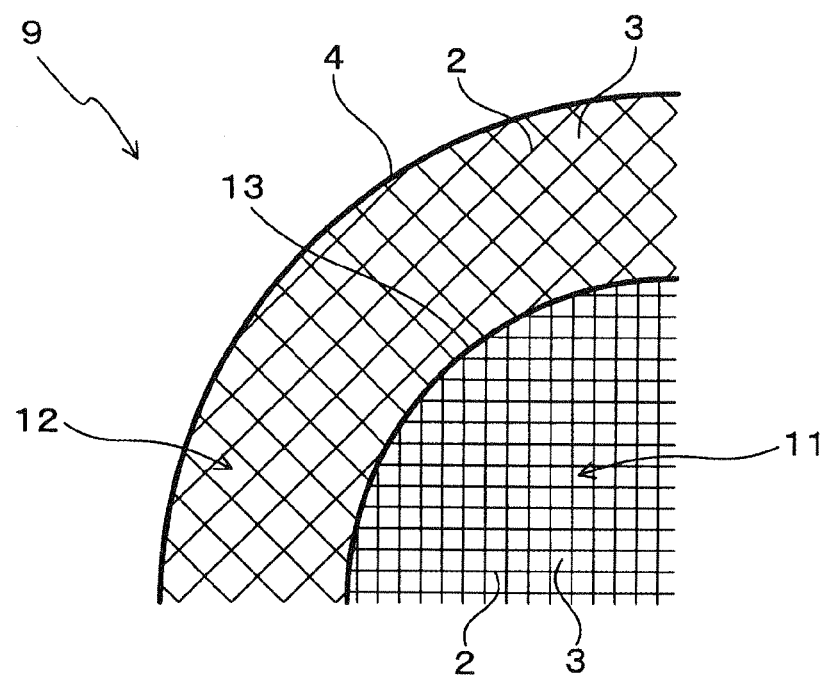
FIG. 10 is a partial cross section perpendicular to an axial direction of a honeycomb structural body as a test example 10 according to a third exemplary embodiment of the present invention.

FIG. 10 is a partial cross section perpendicular to an axial direction of a honeycomb structural body as a test example 10 according to the third exemplary embodiment.

The third exemplary embodiment produced test samples 1 to 14 and evaluated the test samples 1 to 14 regarding the number of defects generated therein and an isostatic strength thereof.

The test samples 1 to 14 had a basic structure which was equal to the basic structure of the honeycomb structural body according to the first exemplary embodiment shown in FIG. 1 and FIG. 2.

As shown in FIG. 10, a honeycomb structural body 9 as the test sample 10 did not have any central reinforced area 111 and the outer circumferential reinforced area 121. That is, in the honeycomb structural body 9 as the test sample 10, the central reinforced cell walls 211 were not formed in the central part 11 and the outer circumferential reinforced cell walls 221 were not formed in the outer circumferential part 12. In other words, the central part 11 had the central basic cell walls 210 only, and the outer circumferential part 12 had the outer circumferential basic cell walls 220 only in the structure of the honeycomb structural body 9 as the test sample 10.

Table 1 shows an average thickness of the cell walls, an average cell pitch of the cells, etc. in each of the central part 11 and the outer circumferential part 12 in each of the test samples 1 to 14.

The average thickness of the cell walls and the average cell pitch of the cells in each of the test samples 1 to 14 were detected and measured by the following method. Each of the test samples 1 to 14 was cut in a cross section which was perpendicular to an axial direction of each test sample, and the cross section thereof was detected by using a scanning electron microscope (SEM). It is acceptable to use an optical microscope, a non-contact type measurement device, etc.

As shown in Table 1, each of the test samples 1 to 9 had a structure which satisfies the relationships defined in the honeycomb structural body 1 according to the first exemplary embodiment and also defined in the claims according to the present invention.

On the other hand, as shown in Table 1, the test samples 10 to 14 (as comparative samples 10 to 14) did not have any structure which satisfies the various relationships defined in the honeycomb structural body 1 according to the first exemplary embodiment and also defined in the claims according to the present invention.

Specifically, in the honeycomb structural body 9 as the test sample 10, no central reinforced area 111 was formed in the central part 11 and no outer circumferential reinforced area 121 was formed in the outer circumferential part 12. That is, as previously described, the honeycomb structural body 9 as the test sample 10 did not have any central reinforced cell walls 211 and the outer circumferential reinforced cell walls 221.

In the structure of the honeycomb structural body as the test sample 11, the average thickness T11 of the central reinforced cell walls and the average thickness T21 of the outer circumferential reinforced cell walls did not satisfy the relationship of T11>T21 (T11/T21>1).

In the structure of the honeycomb structural body as the test sample 12, the average thickness T3 of the boundary partition wall, the average thickness T11 of the central reinforced cell walls and the average thickness T21 of the outer circumferential reinforced cell walls did not satisfy the relationships of T3≥T11 (T3/T11≥1), T3>T21 (T3/T2>1).

Further, in the structure of the honeycomb structural body as the test sample 13, the distance R2 of the outer circumferential part and the average cell pitch P2 of the cells in the outer circumferential part did not satisfy the relationship of R2/P2≥0.5.

Still further, in the structure of the honeycomb structural body as the test sample 14 (as the comparative sample 14), the distance R1 of the central part and the average cell pitch P1 of the cells in the central part did not satisfy the relationship of R1/P1≥0.5.

Next, a description will now be given of the evaluation method of the test samples as the honeycomb structural bodies.

The number of defects in shape was detected on a cross section, which is perpendicular to an axial direction of each test sample by visual inspection or an optical microscope. Occurrence of defects in cell walls was detected and counted when all of or a part of a cell wall was chipped or broken.

The isostatic strength of each test sample was detected on the basis of JASO standard M505-87 (Japanese Automotive Standards Organization M505-87).

TABLE 1

|  | Test sample No. | | | | | | | | |
|---|---|---|---|---|---|---|---|---|---|
|  | 1 | 2 | 3 | 4 | 5 | 6 | 7 | 8 | 9 |
| T10(mm) | 0.090 | 0.095 | 0.092 | 0.092 | 0.091 | 0.089 | 0.088 | 0.095 | 0.094 |
| T11(mm) | 0.215 | 0.232 | 0.120 | 0.267 | 0.110 | 0.296 | 0.232 | 0.220 | 0.219 |
| R1(mm) | 1.0 | 3.0 | 0.6 | 4.0 | 3.0 | 4.0 | 4.0 | 3.0 | 6.0 |
| P1(mm) | 1.04 | 1.04 | 1.04 | 1.04 | 1.04 | 1.04 | 1.04 | 1.04 | 1.04 |

TABLE 1-continued

| T20(mm) | 0.115 | 0.104 | 0.110 | 0.099 | 0.100 | 0.097 | 0.090 | 0.116 | 0.116 |
|---|---|---|---|---|---|---|---|---|---|
| T21(mm) | 0.154 | 0.110 | 0.115 | 0.105 | 0.106 | 0.122 | 0.230 | 0.155 | 0.153 |
| R2(mm) | 4.0 | 5.0 | 0.8 | 3.0 | 3.0 | 3.0 | 3.0 | 7.0 | 3.0 |
| P2(mm) | 1.27 | 1.27 | 1.27 | 1.27 | 1.27 | 1.27 | 1.27 | 1.27 | 1.27 |
| T3(mm) | 0.250 | 0.244 | 0.126 | 0.270 | 0.285 | 0.299 | 0.266 | 0.252 | 0.249 |
| T1/T21 | 1.40 | 2.11 | 1.04 | 2.54 | 1.04 | 2.43 | 1.01 | 1.42 | 1.43 |
| T3/T11 | 1.16 | 1.05 | 1.05 | 1.01 | 2.59 | 1.01 | 1.15 | 1.15 | 1.14 |
| T3/T21 | 1.62 | 2.22 | 1.10 | 2.57 | 2.69 | 2.45 | 1.16 | 1.63 | 1.63 |
| T11/T10 | 2.39 | 2.44 | 1.30 | 2.90 | 1.21 | 3.33 | 2.64 | 2.32 | 2.33 |
| T21/T20 | 1.34 | 1.06 | 1.05 | 1.06 | 1.06 | 1.26 | 2.56 | 1.34 | 1.32 |
| R1/P1 | 0.96 | 2.88 | 0.58 | 3.85 | 2.88 | 3.85 | 3.85 | 2.88 | 5.77 |
| R2/P2 | 3.15 | 3.94 | 0.63 | 2.36 | 2.36 | 2.36 | 2.36 | 5.51 | 2.36 |
| Number of defects | 0 | 0 | 0 | 0 | 0 | 0 | 0 | 0 | 0 |
| Isostatic strength (MPa) | 5.1 | 5.2 | 4.3 | 5.5 | 4.9 | 5.2 | 5.6 | 4.2 | 4.4 |

| | Test sample No. | | | | |
|---|---|---|---|---|---|
| | 10 | 11 | 12 | 13 | 14 |
| T10(mm) | 0.095 | 0.090 | 0.089 | 0.091 | 0.092 |
| T11(mm) | — | 0.114 | 0.1111 | 0.215 | 0.221 |
| R1(mm) | — | 3.0 | 3.0 | 3.0 | 0.4 |
| P1(mm) | 1.04 | 1.04 | 1.04 | 1.04 | 1.04 |
| T20(mm) | 0.110 | 0.105 | 0.103 | 0.114 | 0.143 |
| T21(mm) | — | 0.134 | 0.109 | 0.153 | 0.155 |
| R2(mm) | — | 3.0 | 3.0 | 0.5 | 3.0 |
| P2(mm) | 1.27 | 1.27 | 1.27 | 1.27 | 1.27 |
| T3(mm) | 0.246 | 0.155 | 0.079 | 0.215 | 0.249 |
| T1/T21 | 0.86 | 0.85 | 1.02 | 1.41 | 1.43 |
| T3/T11 | 2.59 | 1.36 | 0.71 | 1.17 | 1.13 |
| T3/T21 | 2.24 | 1.16 | 0.72 | 1.64 | 1.61 |
| T11/T10 | — | 1.27 | 1.25 | 2.36 | 2.40 |
| T21/T20 | — | 1.28 | 1.06 | 1.34 | 1.08 |
| R1/P1 | — | 2.88 | 2.88 | 2.88 | 0.38 |
| R2/P2 | — | 2.36 | 2.36 | 0.39 | 2.36 |
| Number of defects | 28 | 8 | 16 | 22 | 13 |
| Isostatic strength (MPa) | 0.7 | 1.1 | 0.4 | 0.9 | 0.8 |

T10 indicates an average thickness of the central basic cell walls, T11 indicates an average thickness of the central reinforced cell walls, R1 indicates a distance measured from the boundary partition wall toward a radially inward direction of a cross section, P1 indicates an average cell pitch of the cells in the central part, T20 indicates an average thickness of the outer circumferential basic cell walls, T21 indicates an average thickness of the outer circumferential reinforced cell walls, R2 indicates a distance measured from the boundary partition wall toward a radially outward direction of the cross section, P2 indicates an average cell pitch of the cells in the outer circumferential part, and T3 indicates an average thickness of the boundary partition wall 13.

Table 1 shows the number of defects, an isostatic strength and a mass of each of the test samples 1 to 14, As can be understood from the results shown in Table 1, no defect occurs in the test samples 1 to 9 according to the present invention. The test samples 1 to 9 according to the present invention have an isostatic strength having an adequately high value.

On the other hand, defects occurred in each of the test samples 10 to 14 which did not satisfy the relationships defined in the structure of the honeycomb structural body according to the first exemplary embodiment and also defined in the claims of the present invention. That is, the test samples 10 to 14 (as the comparative samples 10 to 14) had a low isostatic strength when compared with the isostatic strength of each of the test samples 1 to 9.

According to the present invention, it is therefore possible to provide the honeycomb structural body having an increased strength while suppressing generation of defects in the cell walls.

Fourth Exemplary Embodiment

A description will now be given of honeycomb structural bodies according to a fourth exemplary embodiment with reference to FIG. 11 to FIG. 22.

The fourth exemplary embodiment evaluated honeycomb structural bodies having various characteristics which were changed. The fourth exemplary embodiment evaluated the honeycomb structural bodies which had the same basic structure of the honeycomb structural body according to the first exemplary embodiment shown in FIG. 1 and FIG. 2. The fourth exemplary embodiment used various different parameters and fixed parameter.

In particular, the fourth exemplary embodiment evaluated the presence of defects caused by external stress, cracks caused by thermal stress, and the presence of cells clogged with catalyst, in addition to the evaluation of an isostatic strength and a pressure loss. The isostatic strength and the presence of defects were detected by the same method disclosed in the third exemplary embodiment previously described.

A pressure loss of the honeycomb structural bodies was detected by a pressure loss detection apparatus. During the evaluation, a pressure loss was detected when a gas was fed through the honeycomb structural bodies. The cell walls in the honeycomb structural bodies were coated with catalyst. The pressure loss detection apparatus was equipped with a differential pressure gauge (or a differential pressure gauge) and a gas blower. In general, the differential pressure gauge detects a difference between a pressure of a gas immediately before when the gas is introduced into a test sample and a pressure of the gas immediately after when the gas is discharged from the test sample. The gas blower is in general mounted to an outlet side of the test sample and promotes the gas flowing through the test sample.

Specifically, an inlet pipe is mounted to an inlet side of the test sample. An outlet pipe is mounted to an outlet side of the test sample. At the room temperature, a gas is supplied into the test sample through the inlet pipe by feeding the gas by the gas blower. The differential pressure gauge (or differential pressure gauge) detects a difference in gas pressure between the inlet side and the outlet side of the test sample. The detected difference is a pressure loss of the test sample.

The evaluation of the presence of cracks was performed by the following method.

The test sample as the honeycomb structural body was heated at a temperature within a range of 900 to 1100° C. Air at the room temperature was fed to the cells at the central part of the honeycomb structural body in order to generate a temperature difference in the honeycomb structural body within a range of 1 to 10° C./mm. This temperature difference caused a thermal stress in the test sample. The presence of cracks in the test sample was detected by visual inspection.

Further, in order to detect the cells clogged with catalyst, the cells in the test sample were detected by visual inspection or using an optical microscope after the cells of the test sample was coated with catalyst.

Figure 11:
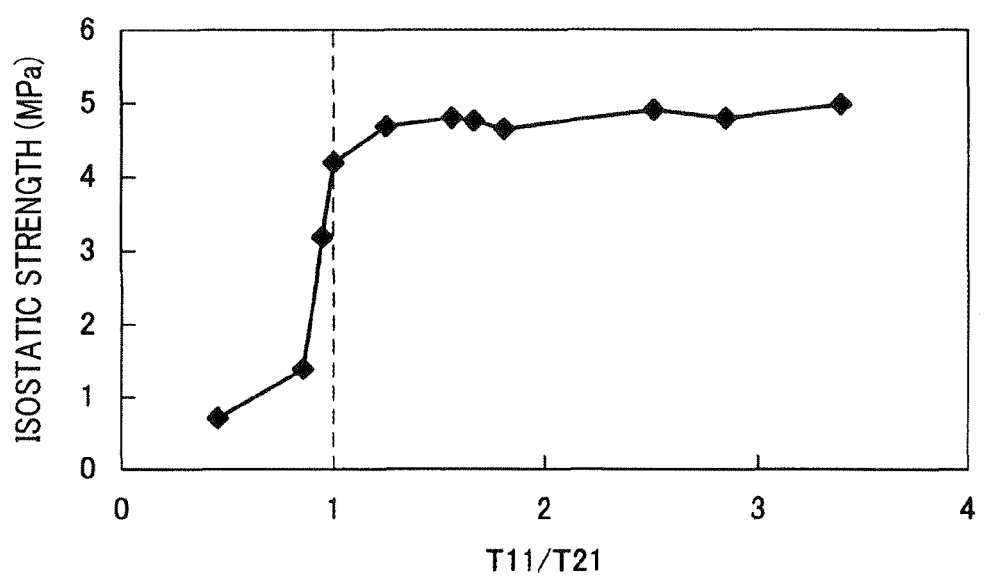
FIG. 11 is a view showing a relationship between a value T11/T21 and an isostatic strength (MPa) of a honeycomb structural body according to a fourth exemplary embodiment of the present invention.

FIG. 11 is a view showing a relationship between a value T11/T21 and an isostatic strength (MPa) of the test samples as the honeycomb structural body. The value T11/T21 and the isostatic strength are variable parameters.

As can be understood from FIG. 11, when the value T11/T21 exceeds a value of 1, the isostatic strength becomes high. On the other hand, when the value T11/T21 is not more than a value of 1, the isostatic strength is drastically decreased. This means the influence caused by the generation of structural defects (a shape failure and defects).

Figure 12:
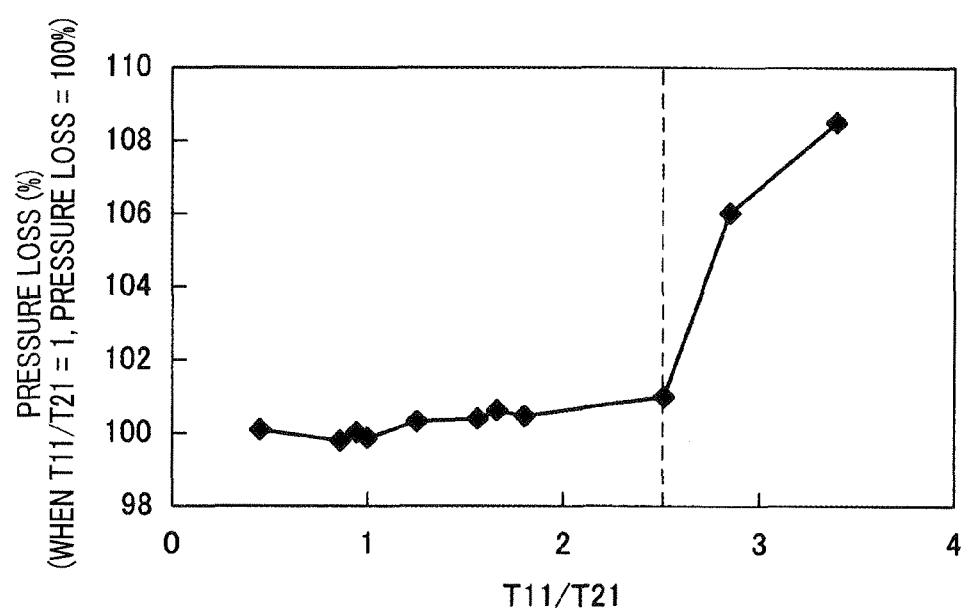
FIG. 12 is a view showing a relationship between a value T11/T21 and a pressure loss (%) of a honeycomb structural body according to the fourth exemplary embodiment of the present invention.

FIG. 12 is a view showing a relationship between a value of T11/T21 and a pressure loss (%) of a honeycomb structural body according to the fourth exemplary embodiment of the present invention. That is, when a value of T11/T21−1, the pressure loss is 100%.

As shown in FIG. 12, when an value of T11/T21 is not less than 2.5, the pressure loss is drastically increased. This means that the cells are clogged by catalyst in a catalyst coating process in a manufacturing process of the honeycomb structural body. It can be understood that the cells of the test sample were clogged with catalyst during the catalyst coating process when the value of T11/T21 is not less than 2.5.

As a result, it can be understood that it is preferable for the average thickness T11 of the central reinforced cell walls and the average thickness T21 of the outer circumferential reinforced cell walls in a honeycomb structural body to satisfy a relationship of 1<T11/T21<2.5.

Next, a description will now be given of a relationship of T3/T11 and an isostatic strength (MPa) of the test sample.

Figure 13:
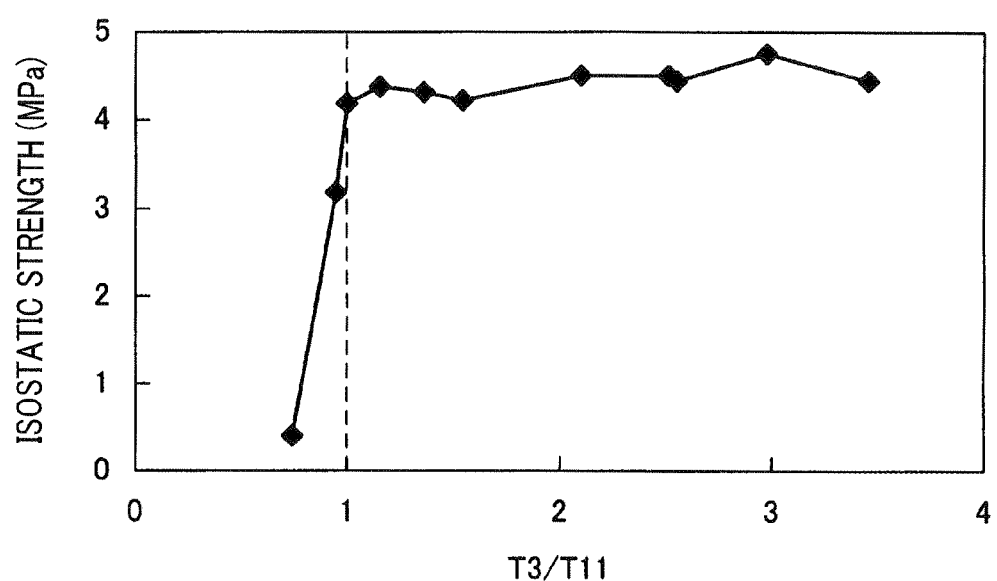
FIG. 13 is a view showing a relationship between a value T3/T11 and an isostatic strength (MPa) of a honeycomb structural body according to the fourth exemplary embodiment of the present invention.

FIG. 13 is a view showing a relationship between a value T3/T11 and an isostatic strength of a honeycomb structural body according to the fourth exemplary embodiment of the present invention.

As can be understood from the results shown in FIG. 13, the isostatic strength of the test sample was drastically increased when the value of T3/T11 is not less than 1.

On the other hand, the isostatic strength of the test sample was drastically decreased when the value of T3/T11 is less than 1. This means that a structural effect (such as failure in shape and defects) was generated in the cell walls of the test sample. As the evaluation results regarding the structural effect, when the value of T3/T11 was less than 1, the structural defect (failure in shape and defects) occurred.

Table 2 also shows a relationship between a value of T3/T11 and occurrence of cracks by thermal stress. As can be understand from the results shown in Table 2, when the value of T3/T11 is not less than 2.5, cracks were caused by thermal stress. That is, when the value of T3/T11 is not less than 2.5, a resistance of a honeycomb structural body against generation of cracks by thermal stress was decreased.

TABLE 2

| T3/T11 | Cracks of thermal stress |
| --- | --- |
| 0.74 | none |
| 1.01 | none |
| 1.05 | none |
| 1.16 | none |
| 1.36 | none |
| 1.55 | none |
| 2.1 | none |
| 2.5 | none |
| 2.52 | occurrence |
| 2.97 | occurrence |
| 3.45 | occurrence |

Figure 14:
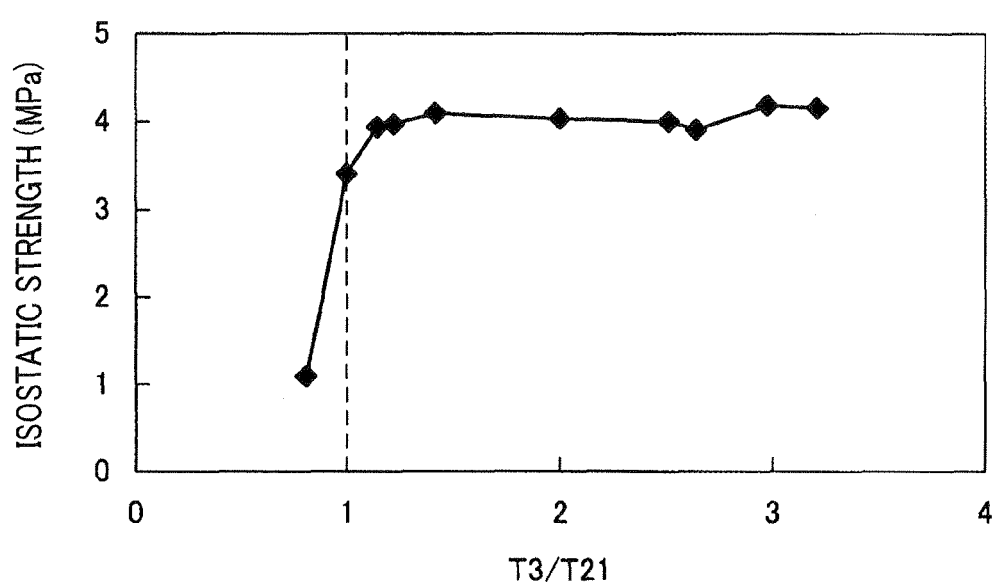
FIG. 14 is a view showing a relationship between a value T3/T21 and an isostatic strength (MPa) of a honeycomb structural body according to the fourth exemplary embodiment of the present invention.

FIG. 14 is a view showing a relationship between a value of T3/T21 and an isostatic strength (MPa) of a honeycomb structural body according to the fourth exemplary embodiment. As can be understand from the results shown in Table 2, when a value of T3/T21 is not less than 1, a honeycomb structural body has a high isostatic strength, for example, more than 3.0. On the other hand, when a value of T3/T21 is not more than 1, an isostatic strength of a honeycomb structural body is drastically decreased. It can be considered that the decrease of the isostatic strength of a honeycomb structural body is caused by generation of structural defects (such as a shape failure). When a value of T3/T21 is not more than 1, a structural defect was generated in a honeycomb structural body.

Table 3 shows a relationship between a value of T3/T21 and occurrence of cracks caused by thermal stress. As can be understand from the results shown in Table 3, when a value of T3/T21 is not less than 2.5, cracks by thermal stress were occurred. That is, when the value of T3/T21 is not less than 2.5, a resistance of a honeycomb structural body against generation of cracks by thermal stress was decreased.

TABLE 3

| T3/T21 | Cracks of thermal stress |
| --- | --- |
| 0.81 | none |
| 1.05 | none |
| 1.14 | none |
| 1.22 | none |
| 1.41 | none |
| 2 | none |
| 2.5 | none |
| 2.64 | occurrence |
| 2.98 | occurrence |
| 3.21 | occurrence |

As a result, it can be understood that it is preferable that the average thickness T3 of the boundary partition wall, the average thickness T11 of the central reinforced cell walls and the average thickness T21 of the outer circumferential reinforced cell walls satisfy a relationship of 1≤T3/T11<2.5 and a relationship of 1<T3/T21<2.5 in a honeycomb structural body.

Figure 15:
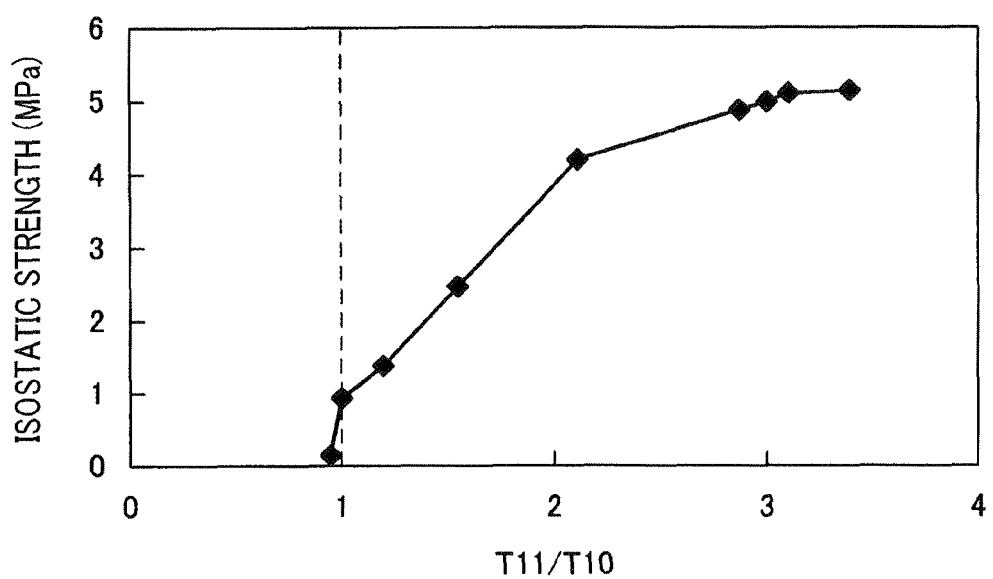
FIG. 15 is a view showing a relationship between a value T11/T10 and an isostatic strength (MPa) of a honeycomb structural body according to the fourth exemplary embodiment of the present invention.

FIG. 15 is a view showing a relationship between a value T11/T10 and an isostatic strength (MPa) of a honeycomb structural body according to the fourth exemplary embodiment. As can be understood from the results shown in FIG. 15, the more a value of T11/T10 is not less than 1, the more an isostatic strength of a honeycomb structural body is increased.

Figure 16:
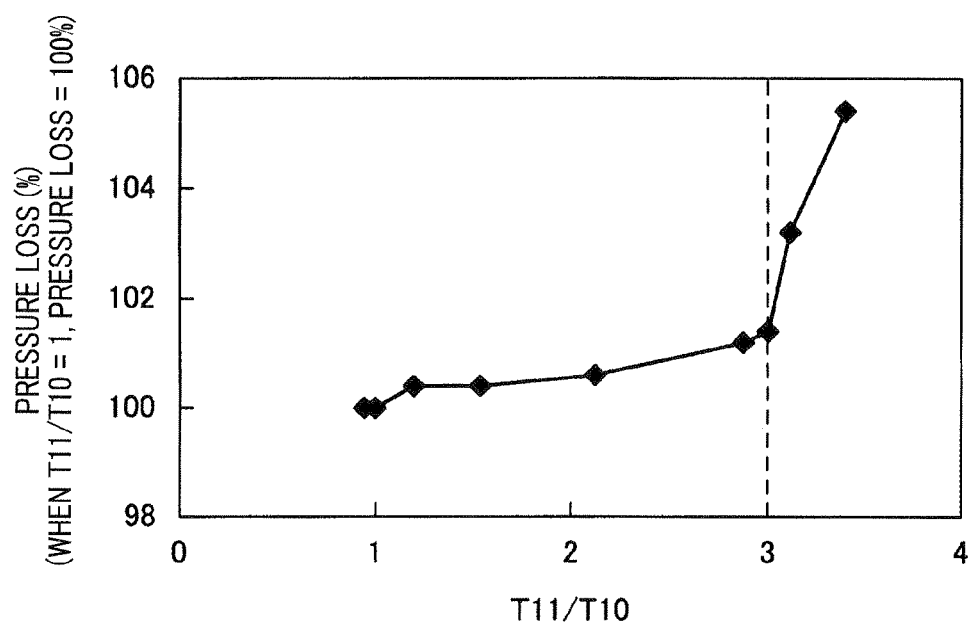
FIG. 16 is a view showing a relationship between a value T11/T10 and a pressure loss (%) of a honeycomb structural body according to the fourth exemplary embodiment of the present invention.

FIG. 16 is a view showing a relationship between a value T11/T10 and a pressure loss pressure loss (%) of a honeycomb structural body according to the fourth exemplary embodiment. As can be understood from the results shown in FIG. 16, when a value of T11/T10 is not less than 3, a pressure loss of a honeycomb structural body is drastically increased. It can be considered that this was caused by generation of clogged cells in a honeycomb structural body in which cells were clogged with catalyst in a catalyst coating process. As a result, evaluating occurrence of clogged cells in each honeycomb structural body, when a value of T10/T11 is not less than 3, clogged cells occurred during the catalyst coating process in manufacturing a honeycomb structural body.

As a result, it can be understood that it is preferable for the average thickness T10 of the central basic cell walls and the average thickness T11 of the central reinforced cell walls in a honeycomb structural body to satisfy a relationship of $1 \leq T11/T10 < 3$.

Figure 17:
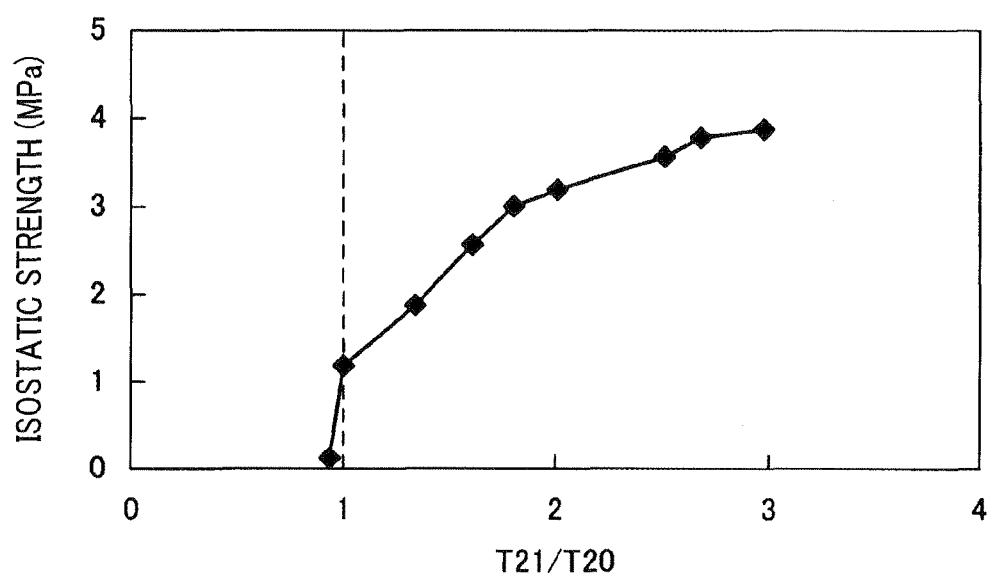
FIG. 17 is a view showing a relationship between a value T21/T20 and an isostatic strength (MPa) of a honeycomb structural body according to the fourth exemplary embodiment of the present invention.

FIG. 17 is a view showing a relationship between a value T21/T20 and an isostatic strength (MPa) of a honeycomb structural body according to the fourth exemplary embodiment. As can be understood from the results shown in FIG. 17, the more a value of T21/T20 is not less than 1, the more an isostatic strength of a honeycomb structural body is increased.

Figure 18:
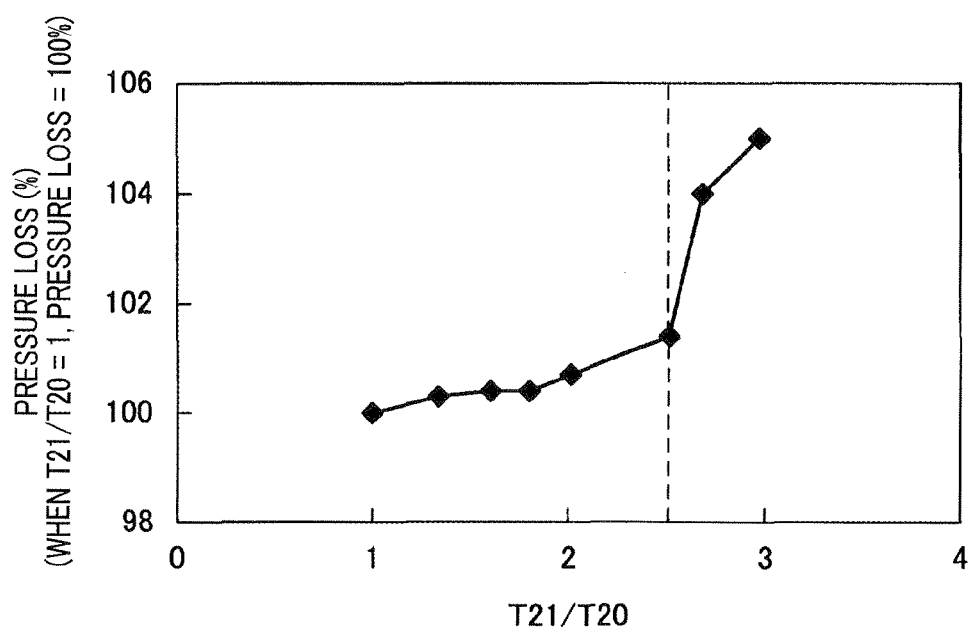
FIG. 18 is a view showing a relationship between a value T21/T20 and a pressure loss (%) of a honeycomb structural body according to the fourth exemplary embodiment of the present invention.

FIG. 18 is a view showing a relationship between a value T21/T20 and a pressure loss pressure loss (%) of a honeycomb structural body according to the fourth exemplary embodiment. In FIG. 18, when a value of T21/T20 is 1, a pressure loss has 100%. As can be understood from the results shown in FIG. 18, when a value of T20/T21 is not less than 2.5, a pressure loss of a honeycomb structural body is drastically increased. It can be considered that this was caused by generation of clogged cells in a honeycomb structural body in which cells were clogged with catalyst in a catalyst coating process. As a result of evaluation regarding occurrence of clogged cells in each honeycomb structural body, when a value of T21/T20 is not less than 2.5, clogged cells occurred during the catalyst coating process in manufacturing a honeycomb structural body.

As a result, it can be understood that it is preferable for the average thickness T20 of the outer circumferential basic cell walls and the average thickness T21 of the outer circumferential reinforced cell walls in a honeycomb structural body to satisfy a relationship of $1 < T21/T20 < 2.5$.

Figure 19:
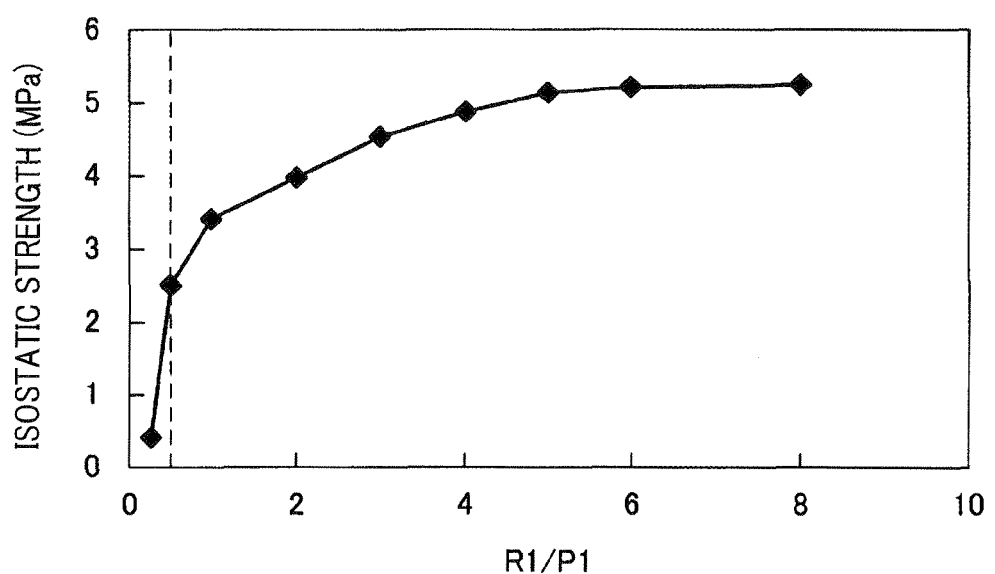
FIG. 19 is a view showing a relationship between a value R1/P1 and an isostatic strength (MPa) of a honeycomb structural body according to the fourth exemplary embodiment of the present invention.

FIG. 19 is a view showing a relationship between a value R1/P1 and an isostatic strength (MPa) of a honeycomb structural body according to the fourth exemplary embodiment. As can be understood from the results shown in FIG. 19, when a value of R1/P1 is not less than 0.5, an isostatic strength (MPa) of a honeycomb structural body is increased. Further, when a value of R1/P1 is not less than 5, an isostatic strength (MPa) of a honeycomb structural body becomes approximately a constant value. On the other hand, when a value of R1/P1 is not more than 0.5, an isostatic strength (MPa) of a honeycomb structural body is drastically decreased. It can be considered that this was caused by generation of structural defects in a honeycomb structural body. As a result of evaluating structural defects in each honeycomb structural body, when a value of R1/P1 is not more than 0.5, structural defects occurred in a honeycomb structural body.

Figure 20:
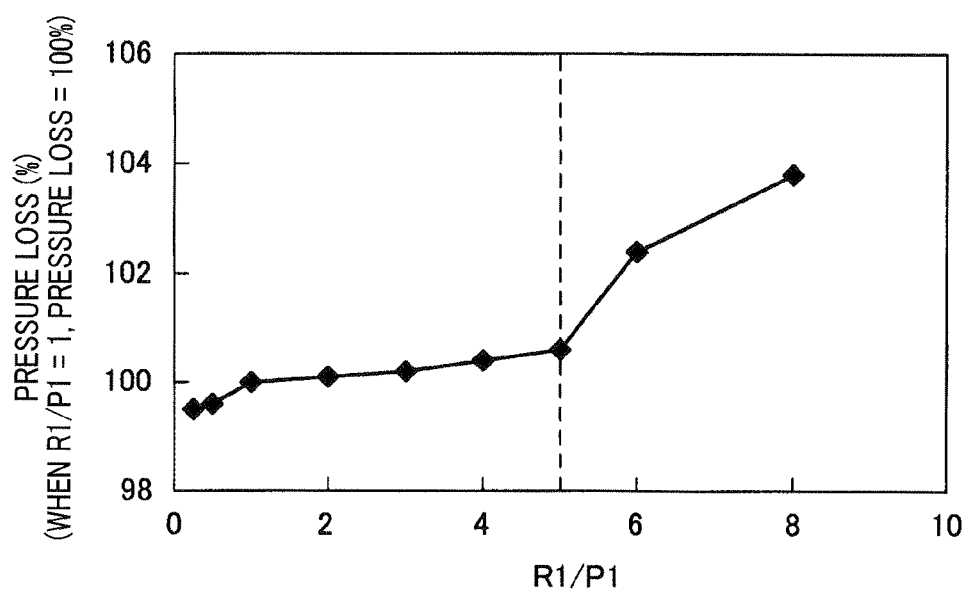
FIG. 20 is a view showing a relationship between a value R1/P1 and a pressure loss (%) of a honeycomb structural body according to the fourth exemplary embodiment of the present invention.

FIG. 20 is a view showing a relationship between a value R1/P1 and a pressure loss (%) of a honeycomb structural body according to the fourth exemplary embodiment. In FIG. 18, when a value of R1/P1 is 1, a pressure loss becomes 100%. As can be understood from the results shown in FIG. 20, when a value of R1/P1 exceeds 5, a pressure loss (%) of a honeycomb structural body was drastically increased.

As a result, it can be understood that it is preferable for the distance R1 of the central part and the average cell pitch P1 of the cells in the central part in a honeycomb structural body to satisfy a relationship of $0.5 \leq R1/P1 \leq 5$.

Figure 21:
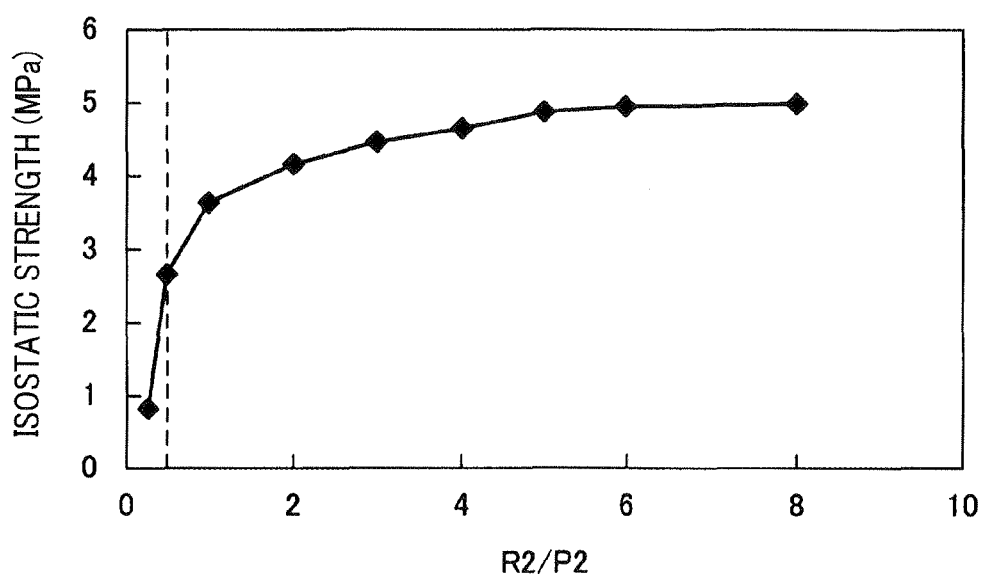
FIG. 21 is a view showing a relationship between a value R2/P2 and an isostatic strength (MPa) of a honeycomb structural body according to the fourth exemplary embodiment of the present invention.

FIG. 21 is a view showing a relationship between a value R2/P2 and an isostatic strength (MPa) of a honeycomb structural body according to the fourth exemplary embodiment. As can be understood from the results shown in FIG. 21, when a value of R2/P2 is not less than 0.5, an isostatic strength (MPa) of a honeycomb structural body is increased. Further, when a value of R2/P2 is not less than 5, an isostatic strength (MPa) of a honeycomb structural body is saturated and becomes approximately a constant value. On the other hand, when a value of R2/P2 is not more than 0.5, an isostatic strength (MPa) of a honeycomb structural body is drastically decreased to a low value. It can be considered that this was caused by generation of structural defects in a honeycomb structural body. As a result of evaluating structural defects in each honeycomb structural body, when a value of R2/P2 was not more than 0.5, structural defects occurred in a honeycomb structural body.

Figure 22:
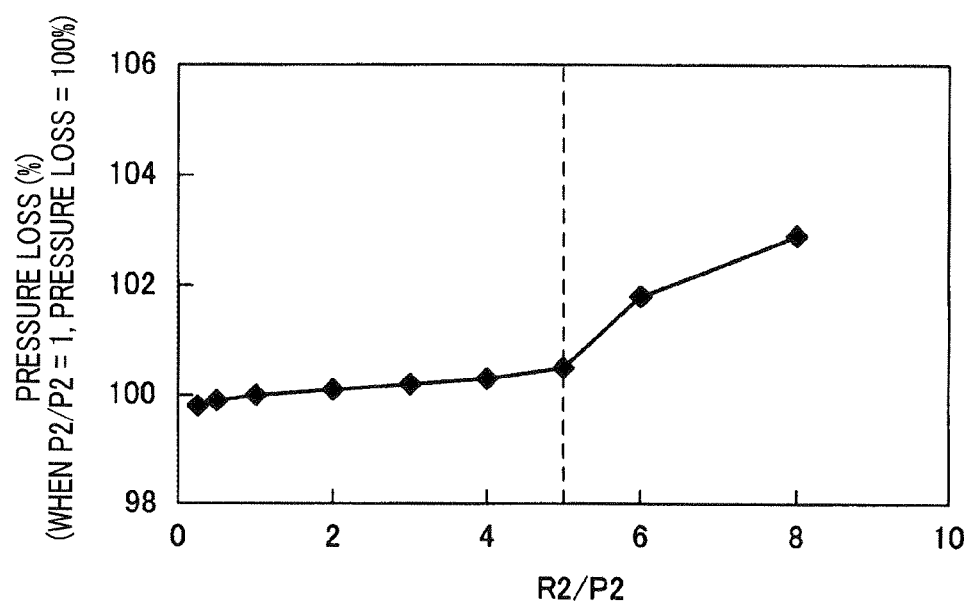
FIG. 22 is a view showing a relationship between a value R2/P2 and a pressure loss (%) of a honeycomb structural body according to the fourth exemplary embodiment of the present invention.

FIG. 22 is a view showing a relationship between a value R2/P2 and a pressure loss (%) of a honeycomb structural body according to the fourth exemplary embodiment. In FIG. 22, when a value of R2/P2 exceeds 5, a pressure loss becomes 100%. As can be understood from the results shown in FIG. 22, when a value of R2/P2 exceeds 5, a pressure loss (%) of a honeycomb structural body is drastically increased.

As a result, it can be understood that it is preferable for the distance R2 of the outer circumferential part and the average cell pitch P2 of the cells in the outer circumferential part in a honeycomb structural body to satisfy a relationship of $0.5 \leq R2/P2 \leq 5$.

While specific embodiments of the present invention have been described in detail, it will be appreciated by those skilled in the art that various modifications and alternatives to those details could be developed in light of the overall teachings of the disclosure. Accordingly, the particular arrangements disclosed are meant to be illustrative only and not limited to the scope of the present invention which is to be given the full breadth of the following claims and all equivalents thereof.

What is claimed is:
1. A honeycomb structural body comprising:
a plurality of cells and cell walls, each of the cells being surrounded by the cell walls, wherein
the honeycomb structural body comprises a central part, an outer circumferential part and a boundary partition wall,
the central part includes a central axis of the honeycomb structural body and is covered with the outer circumferential part,
the outer circumferential part is lower in cell density than the central part,
the boundary partition wall is formed between the central part and the outer circumferential part,
the cell walls in the central part comprise central basic cell walls and central reinforced cell walls, the central reinforced cell walls are formed in a central reinforced area within a distance R1 which is measured from the boundary partition wall toward a radially inward direction of a cross section which is perpendicular to an axial direction of the honeycomb structural body, the central reinforced cell walls surround all of cells having an opening part in the central reinforced area, the cell walls in the outer circumferential part comprise outer circumferential basic cell walls and outer circumferential reinforced cell walls, the outer circumferential reinforced cell walls are formed in an outer circumferential reinforced area within a distance R2 which is measured from the boundary partition wall toward a radially outward direction of the cross section, the outer circumferential reinforced cell walls surround all of cells having an opening part in the outer circumferential reinforced area, the honeycomb structural body satisfies:

a first relationship of $T10<T11$, where $T10$ indicates an average thickness of the central basic cell walls, and $T11$ indicates an average thickness of the central reinforced cell walls;

a second relationship of $T20<T21$, where $T20$ indicates an average thickness of the outer circumferential basic cell walls, and $T21$ indicates an average thickness of the outer circumferential reinforced cell walls;

a third relationship of $R1/P1 \geq 0.5$, where $P1$ indicates an average cell pitch of the cells in the central part;

a fourth relationship of $R2/P2 \geq 0.5$, where $P2$ indicates an average cell pitch of the cells in the outer circumferential part;

a fifth relationship of $T10 \leq T20$;

a sixth relationship of $T11 > T21$;

a seventh relationship of $T3 > T10$ and $T3 > T20$, where $T3$ indicates an average thickness of the boundary partition wall; and an eighth relationship of $T3 \geq T11$ and $T3 > T21$.

2. The honeycomb structural body according to claim 1, wherein a relationship of $1 < T11/T21 < 2.5$ is further satisfied.

3. The honeycomb structural body according to claim 2, wherein a relationship of $1 \leq T3/T11 < 2.5$ and a relationship of $1 < T3/T21 < 2.5$ are further satisfied.

4. The honeycomb structural body according to claim 3, wherein a relationship of $1 \leq T11/T10 < 3$ and a relationship of $1 < T21/T20 < 2.5$ are further satisfied.

5. The honeycomb structural body according to claim 4, wherein a relationship of $0.5 \leq R1/P1 \leq 5$ and a relationship of $0.5 \leq R2/P2 \leq 5$ are further satisfied.

6. The honeycomb structural body according to claim 3, wherein a relationship of $0.5 \leq R1/P1 \leq 5$ and a relationship of $0.5 \leq R2/P2 \leq 5$ are further satisfied.

7. The honeycomb structural body according to claim 2, wherein a relationship of $1 \leq T11/T10 < 3$ and a relationship of $1 < T21/T20 < 2.5$ are further satisfied.

8. The honeycomb structural body according to claim 7, wherein a relationship of $0.5 \leq R1/P1 \leq 5$ and a relationship of $0.5 \leq R2/P2 \leq 5$ are further satisfied.

9. The honeycomb structural body according to claim 2, wherein a relationship of $0.5 \leq R1/P1 \leq 5$ and a relationship of $0.5 \leq R2/P2 \leq 5$ are further satisfied.

10. The honeycomb structural body according to claim 1, wherein a relationship of $1 \leq T3/T11 < 2.5$ and a relationship of $1 < T3/T21 < 2.5$ are further satisfied.

11. The honeycomb structural body according to claim 10, wherein a relationship of $1 \leq T11/T10 < 3$ and a relationship of $1 < T21/T20 < 2.5$ are further satisfied.

12. The honeycomb structural body according to claim 11, wherein a relationship of $0.5 \leq R1/P1 \leq 5$ and a relationship of $0.5 \leq R2/P2 \leq 5$ are further satisfied.

13. The honeycomb structural body according to claim 10, wherein a relationship of $0.5 \leq R1/P1 \leq 5$ and a relationship of $0.5 \leq R2/P2 \leq 5$ are further satisfied.

14. The honeycomb structural body according to claim 1, wherein a relationship of $1 \leq T11/T10 < 3$ and a relationship of $1 < T21/T20 < 2.5$ are further satisfied.

15. The honeycomb structural body according to claim 14, wherein a relationship of $0.5 \leq R1/P1 \leq 5$ and a relationship of $0.5 \leq R2/P2 \leq 5$ are further satisfied.

16. The honeycomb structural body according to claim 1, wherein a relationship of $0.5 \leq R1/P1 \leq 5$ and a relationship of $0.5 \leq R2/P2 \leq 5$ are further satisfied.

* * * * *